US006641365B2

(12) United States Patent
Karem

(10) Patent No.: US 6,641,365 B2
(45) Date of Patent: *Nov. 4, 2003

(54) OPTIMUM SPEED TILT ROTOR

(76) Inventor: Abraham E. Karem, 29312 Wood Canyon Rd., Silverado, CA (US) 92676

(*) Notice: Subject to any disclaimer, the term of this patent is extended or adjusted under 35 U.S.C. 154(b) by 0 days.

This patent is subject to a terminal disclaimer.

(21) Appl. No.: 10/029,597

(22) Filed: Oct. 24, 2001

(65) Prior Publication Data

US 2002/0154996 A1 Oct. 24, 2002

Related U.S. Application Data

(63) Continuation-in-part of application No. 09/731,150, filed on Dec. 5, 2000, now abandoned, which is a continuation of application No. 09/434,691, filed on Nov. 5, 1999, now abandoned, which is a continuation of application No. 09/253,391, filed on Feb. 19, 1999, now Pat. No. 6,007,298.
(60) Provisional application No. 60/075,509, filed on Feb. 20, 1998, and provisional application No. 60/311,983, filed on Aug. 13, 2001.

(51) Int. Cl.[7] .............................................. B64C 27/52
(52) U.S. Cl. .................... 416/1; 416/131; 416/241 R; 416/44
(58) Field of Search ........................ 416/1, 36, 44, 416/131, 241 R; 244/7 R, 12.4

(56) References Cited

U.S. PATENT DOCUMENTS

| | | | |
|---|---|---|---|
| 3,713,751 A | 1/1973 | Fradenburgh et al. | 416/87 |
| 3,960,348 A | 6/1976 | Fowler et al. | 244/83 D |
| 4,071,811 A | 1/1978 | Irwin | 318/16 |
| 4,115,755 A | 9/1978 | Cotton | 340/27 R |
| 4,142,697 A * | 3/1979 | Fradenburgh | 244/7 R |
| 4,427,344 A | 1/1984 | Perry | 416/223 R |
| 4,601,639 A | 7/1986 | Yen et al. | 416/230 |
| 4,632,337 A | 12/1986 | Moore | 244/17.19 |
| 4,783,023 A | 11/1988 | Jupe | 244/6 |
| 6,007,298 A * | 12/1999 | Karem | 416/44 |

FOREIGN PATENT DOCUMENTS

| | | |
|---|---|---|
| EP | 0 588 360 A1 | 3/1994 |
| EP | 0 739 815 | 10/1996 |

OTHER PUBLICATIONS

Braverman, Alexander S., "Operating Cost Reduction Through Helicopter Cruise Flight Optimization" Mil Moscow Helicopter Plant, Russia, Copyright © 1997 by the American Helicopter Society, Inc. pp. 133–138, 5/97.
Attifellner, Siegfried, Eurocopter EC 135 Qualification For the Market, Munich, Germany, pp. 37.1–37.9.
Lockheed Model 286; Lockheed Cheyenne AH–56A (1 page).
Proctor, Paul, Mitsubishi Tests Civil Markets With All–Japanese MH–2000, Japanese Aerospace, Nagoya, Japan (2 pages).

* cited by examiner

Primary Examiner—Ninh H. Nguyen
(74) Attorney, Agent, or Firm—Christie, Parker & Hale, LLP

(57) ABSTRACT

A variable speed helicopter tilt rotor system and method for operating such a system are provided which allow the helicopter rotor to be operated at an optimal angular velocity in revolutions per minute (RPM) minimizing the power required to turn the rotor thereby resulting in helicopter performance efficiency improvements, reduction in noise, and improvements in rotor, helicopter transmission and engine life. The system and method provide for an increase in helicopter endurance and range. The system and method also provide a substantial improvement in helicopter performance during take-off, hover and maneuver. All such improvements are valid in helicopter mode when the helicopter is supported by rotor vertical lift, in airplane mode when the helicopter is supported by wing lift and the rotor is tilted forward to provide propulsive thrust and in conversion from helicopter mode to airplane mode.

29 Claims, 23 Drawing Sheets

Blade Loading for a Typical Tilt Rotor in Helicopter Mode

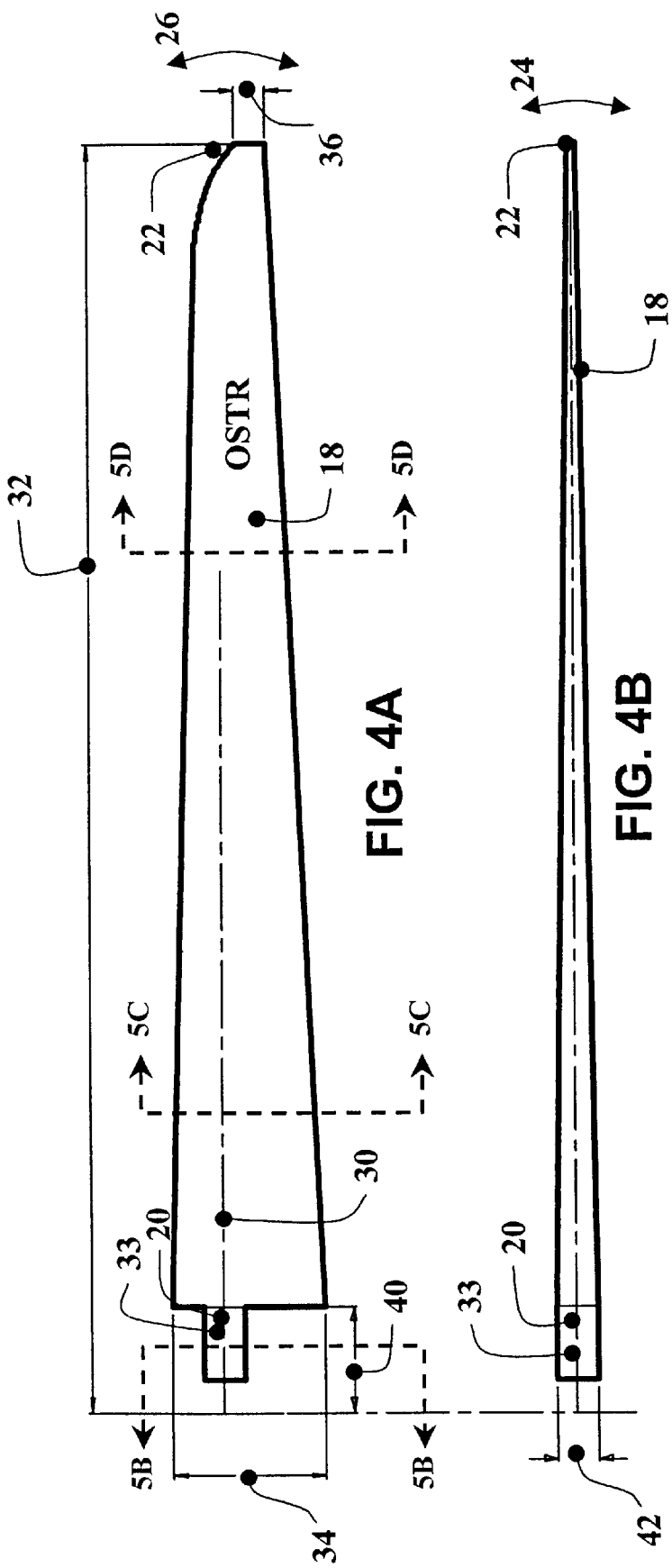
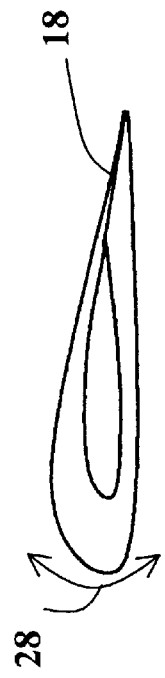
FIG. 4A
FIG. 4B
FIG. 4C

| Blade station %R | Dimensions | | | | | Stiffness | | | Weights | |
|---|---|---|---|---|---|---|---|---|---|---|
| | Radius (in) | Chord (in) | Thickness (in) | Thickness ratio | Spar width (in) | Effective spar height (in) | Flap stiffness ($10^6$ lb in$^2$) | Lag stiffness ($10^6$ lb in$^2$) | Torsional stiffness ($10^6$ lb in$^2$) | Blade section weight (lb/in) | Blade section center of gravity |
| 10% | 18 | 21.2 | 5.50 | 25.9% | 3.62 | 5.50 - 4.70 | 1,059.7 | 1,020.8 | 171.7 | 0.342 | 27.1% |
| 20% | 36 | 20.1 | 4.89 | 24.3% | 3.42 | 4.89 - 4.25 | 606.0 | 634.4 | 121.9 | 0.262 | 29.4% |
| 30% | 54 | 18.9 | 4.11 | 21.7% | 3.18 | 4.11 - 3.61 | 303.1 | 348.7 | 76.7 | 0.201 | 32.5% |
| 40% | 72 | 17.7 | 3.39 | 19.1% | 2.95 | 3.39 - 2.99 | 153.8 | 218.4 | 46.6 | 0.164 | 34.5% |
| 50% | 90 | 16.5 | 2.81 | 17.0% | 2.73 | 2.81 - 2.45 | 88.4 | 149.1 | 29.5 | 0.141 | 35.4% |
| 60% | 108 | 15.3 | 2.28 | 14.9% | 2.51 | 2.28 - 1.92 | 53.3 | 107.3 | 17.7 | 0.128 | 36.0% |
| 70% | 126 | 14.1 | 1.95 | 13.9% | 2.29 | 1.95 - 1.59 | 36.0 | 83.1 | 11.8 | 0.116 | 35.8% |
| 80% | 144 | 12.7 | 1.64 | 12.9% | 2.06 | 1.64 - 1.28 | 22.8 | 60.8 | 7.4 | 0.104 | 35.9% |
| 90% | 162 | 11.1 | 1.33 | 12.0% | 1.80 | 1.33 - 0.97 | 13.2 | 40.8 | 4.2 | 0.093 | 36.3% |
| 95% | 171 | 9.5 | 1.03 | 10.9% | 1.53 | 1.03 - 0.67 | 6.7 | 25.1 | 2.1 | 0.077 | 36.0% |

FIG. 5A

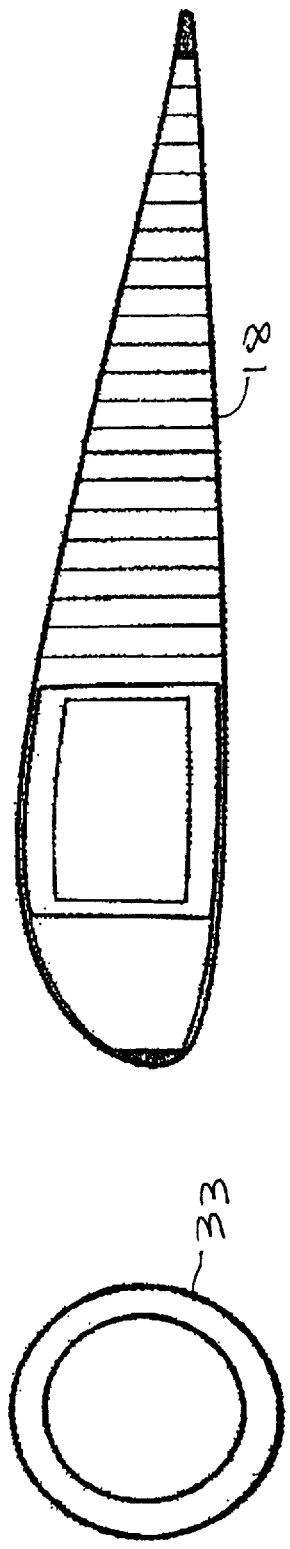
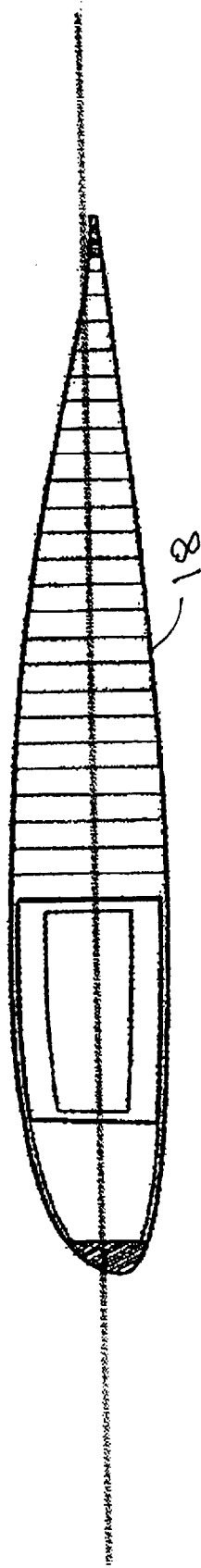
FIG. 5B
FIG. 5C
FIG. 5D

| Blade and Rotor | | | |
|---|---|---|---|
| | Convent-ional | OSTR | Ratio (OSTR/Conv.) |
| Blade Weight/Area (lb/ft²) | 5.42 | 1.65 | 0.30 |
| Blade Root Stiffness (EI x 10⁶ lb*in²) | 181 | 1,060 | 5.9 |
| Blade Mass Moment of Inertia (Slug*ft²) | 34.4 | 42 | 1.22 |
| Rotor Type | Gimbaled | Hingeless | --- |
| No. of Blades | 3 | 3 | 1 |
| Helicopter Max. Gross Weight (lb) | 8,000 | 8,000 | 1 |
| Max. Disc Loading (lb/ft²) | 13.24 | 5.66 | 0.43 |
| RPM Range - Helicopter Mode | 720 | 230-360 | --- |
| RPM Range - Aircraft Mode | 583 | 75-180 | --- |
| Tip Mach Number - Helicopter Mode | 0.66 | .32-.51 | .48-.77 |

FIG. 7A

Blade Dimensions & Weights

| | Conventional | OSTR | Ratio (OSTR/Conv.) |
|---|---|---|---|
| Blade Area (ft²) | 9.0 | 20.6 | 2.29 |
| Blade Taper Ratio | 1 | 0.47 | 0.47 |
| Thickness Ration | 30%-8% | 26%-11% | 0.87-1.38 |
| Max Thickness (in)* | 2.64 | 4.11 | 1.56 |
| Blade Solidity Factor | 0.0297 | 0.0237 | 0.80 |
| Blade Weight (lb) | 47.7 | 34 | 0.71 |

*At 30% radius

FIG. 7B

Blade Twist (Incidence) of Conventional Tilt Rotors vs. OSTR

Hover Power/Weight vs. Rotor Disc Loading

Power Required for Flight in Helicopter Mode at 1,814kg (4,000 lb) [Sea Level]

Power Required for Flight in Helicopter Mode at 2,721kg (6,000 lb) [Sea Level]

Power Required for Flight in Helicopter Mode at 3,628kg (8,000 lb) [Sea Level]

Propeller Efficiency in Aircraft Level Flight at 1,814 kg (4,000 lb) at 25,000 Ft Propeller Efficiency in Aircraft Level Flight at 2,712 kg (6,000 lb) at 25,000 Ft Propeller Efficiency in Aircraft Level Flight at 3,628 kg (8,000 lb) at 10,000 Ft

OPTIMUM SPEED TILT ROTOR

CROSS REFERENCE TO RELATED APPLICATIONS

This application is a continuation-in-part of U.S. patent application Ser. No. 09/731,150 filed on Dec. 5, 2000, now ABN which is a continuation of U.S. patent application Ser. No. 09/434,691 filed on Nov. 5, 1999 now abandoned, which is a continuation of U.S. patent application Ser. No. 09/253,391 filed on Feb. 19, 1999 and issued as U.S. Pat. No. 6,007,298, which claimed the benefit of the filing date of U.S. Provisional Patent Application No. 60/075,509, filed Feb. 20, 1998, the contents of which are hereby incorporated by reference, and also claims priority of the filing date and is based upon U.S. Provisional Patent Application No. 60/311,983 filed on Aug. 13, 2001, the contents of which are hereby fully incorporated herein by reference.

FIELD OF THE INVENTION

This invention relates to tilt rotor helicopters and specifically to helicopters having variable speed tilt rotors for achieving substantial increases in endurance, range, altitude and speed and reductions in noise levels and fuel consumption.

BACKGROUND OF THE INVENTION

The efficiency of an aircraft, whether fixed wing or rotorcraft, as expressed by the fuel consumption required to achieve a specific performance as for example, cruise, climb, or maximum speed, is directly proportional to the power required to achieve such performance. The power required is inversely proportional to the ratio of the aircraft lift to the drag (L/D). In order to increase an aircraft efficiency designers strive to increase the lift to drag ratio by minimizing the aircraft drag at lift levels required to counter the aircraft weight and to allow for aircraft maneuvering.

The lift and drag of an aircraft are determined by the following formulas, respectively:

$$L = \tfrac{1}{2}\rho V^2 S C_L \quad (1)$$

$$D = \tfrac{1}{2}\rho V^2 S C_D \quad (2)$$

Where $\rho$ is the air density, V is the air velocity (airspeed), S is the reference area of the lifting surface (wing or rotor blade), $C_L$ and $C_D$ are non-dimensional lift and drag coefficients. The lift to drag ratio L/D is equal to coefficient of lift to the coefficient of drag ratio, $C_L/C_D$. Thus, the ratio of the coefficient of lift to the coefficient of drag, $C_L/C_D$, has a direct effect on performance. The $C_L/C_D$ is a function of $C_L$ as can be seen by the $C_L$ V. $C_L/C_D$ graph depicted in FIG. 1 for a typical airfoil. For best cruise efficiency, the coefficient of lift of the lifting airfoil should be maintained at levels of maximum $C_L/C_D$.

In a helicopter the lift and drag of the rotor blades conform to the same lift formula $L = \tfrac{1}{2}\rho V^2 S C_L$ where V is the local airspeed on the blade which, in a hovering helicopter is a result of the blade angular velocity in revolutions per minute (RPM). For convenience, "RPM" as used herein refers to rotor angular velocity. Moreover, the term "helicopter" as used herein encompasses all types of rotorcraft.

In a hovering helicopter, the speed of the rotor blade increases radially outward. At any given radial distance from the rotor center, the speed of the blade is given by the equation:

$$vr = \frac{2\pi r (RPM)}{60} \quad (3)$$

where, $v_r$ is the rotational speed and r is the radial distance measured from the rotor center.

A helicopter in a substantial forward speed (e.g., 100–200 mph) experiences problems of control, vibration and limitations in performance resulting from the asymmetry in the speeds of the advancing and retreating blades. When traveling in a forward direction 8, the advancing blade 10 has a speed equal the rotational speed of the blade plus the forward speed of the helicopter, whereas the retreating blade 12 has a speed equal the rotational speed of the blade minus the forward speed of the helicopter. The speeds along the length of the blades when traveling forward are shown in FIG. 2. As a result, the advancing blade has more lift than the retreating blade. To avoid helicopter roll over due the airspeed asymmetry, the lift on the retreating blade has to be increased while the speed on the advancing blade has to be decreased. Because, lift is inversely proportional to the velocity (i.e., speed) of the blade squared ($V^2$) a substantial increase in the coefficient of lift ($C_L$) of the retreating blade is required. The available lift coefficient for a given blade is limited as shown FIG. 1. Consequently, the asymmetry in speeds between the advancing and retreating blades has to be limited thereby limiting the forward speed of the helicopter.

Increasing the RPM of the rotor reduces the relative asymmetry of the airspeed distribution, thus reducing the effects of forward speed on roll control limits. But such RPM increase is constrained by the maximum allowable rotor tip speed. The maximum allowable tip speed is typically lower than the speed of sound (i.e., Mach 1) so as to avoid the substantial increases in drag, vibration and noise encountered when the tip speed approaches Mach 1.

Current helicopter rotors turn at a constant RPM throughout the flight because of the complex and severe rotor dynamics problems. Generally, helicopter designers are content if they succeed in the development of a single speed rotor, which can go from zero to design RPM when not loaded on the ground during start and stop without encountering vibration loads which overstress the helicopter and rotor structure. When the blades of a conventional rotor are producing lift, a significant change of the rotor blade RPM from the design RPM may yield catastrophic results.

Conventional helicopter rotors are designed to achieve blade flap, lag and torsional natural oscillation frequencies, at the operating RPM, which are adequately separated from the rotor excitation frequencies occurring at the rates of 1 per revolution, 2 per revolution, 3 per revolution and so forth. For example, for a rotor operating at 360 RPM, the frequency corresponding to the occurrence of a rotor excitation frequency of 1 per revolution is 6 Hz (360 RPM is 6 cycles per second), 2 per revolution is 12 Hz, and so forth. As the rotor RPM is changed so are the excitation frequencies. For convenience, the frequencies which give rise to these excitation frequencies are referred to herein by the excitation frequency occurrence rates. For example a frequency that gives rise to an excitation frequency that occurs at a rate of 2 per revolution is referred to herein as the "2 per revolution" frequency. For good dynamic behavior, considering both blade loads and helicopter vibration, conventional rotors with any number of blades are designed to avoid the frequencies of 1 per revolution, 2 per revolution, 3 per revolution and so forth. Conventional rotor blades are designed to operate at 100% of design RPM with the fundamental flap mode at a frequency above the 1 per revolution frequency, the fundamental lag mode usually below the 1 per revolution frequency and sometimes between the 1 per revolution and the 2 per revolution frequencies, and the blade dynamics tuned so that higher flap, lag torsion modes avoid the 1, 2, 3, 4, . . . n per revolution frequencies. The conventional blade design modes (i.e., modal frequencies) must be kept separated from the 1, 2, 3, 4, . . . n per revolution frequencies to avoid the generation of vibration loads which may be catastrophic. As a minimum, such vibration loads will make the helicopter unacceptable for the pilot and passengers and detrimental to the reliability of its mechanisms and equipment. To avoid such vibration loads, the rotor angular velocity is limited to a narrow range around 100% of design RPM, except for start-up and shut-down at low or no rotor load and low wind speed.

The RPM of helicopter rotors is normally set for a maximum forward speed at a maximum weight at a certain critical altitude. The RPM of the rotor is such that at maximum forward speed, the tip of the advancing blade is traveling at speeds near but below Mach 1, to avoid the substantial increases in drag, vibration and noise encountered at speeds approaching Mach 1. At any other flight conditions, the rotor RPM and thus, the power required to turn the rotor are substantially higher than that required for efficient operation.

Some research helicopters such as the Lockheed XH-51A compound helicopter have experimented with rotor RPM reduction at certain flight conditions by incorporating a wing for producing most of the required lift and a jet or a propeller driving engine for producing the required forward thrust. The use of the wings and engine relieve the rotor of its duty to produce lift and thrust, thus allowing the unloaded rotor to operate at reduced RPM. In this regard, a helicopter can fly at higher speeds before the tip of the advancing blade approaches the speed of sound and encounters the increased levels of vibration and noise as well as drag.

Other attempts have been made in improving helicopter maximum forward speeds and/or reducing noise at maximum speed by using 2-speed gearboxes. These gearboxes allow the rotor to rotate at two RPM values while maintaining a constant engine RPM. The rotor is set to rotate at a lower RPM when at high forward speed so as to reduce the rotor tip speed. In all other conditions, the rotor is set to rotate at the higher RPM. However, these attempts do not substantially improve the efficiency of the helicopter by reducing fuel consumption.

Another helicopter uses 10% reduction in rotor RPM during takeoff and landing in order to conform to very strict noise limitations. Because of this reduction in rotor RPM, the helicopter performance is compromised during take-off and landing.

While these aforementioned endeavors attempted to increase maximum speed and reduce noise during take-off and landing, neither attempted to improve the efficiency of the helicopter. Neither attempted to reduce the fuel consumed and power required for a given performance or attempted to increase a helicopter performance without increasing the fuel consumed and the power required. As such there is a need for a helicopter rotor system which will improve helicopter range, altitude and speed performance while reducing fuel consumption and noise levels.

Tilt rotor type rotorcraft incorporate wings which produce lift in forward flight, and, at forward speeds which is adequate to support the weight of the rotorcraft. The rotors (usually 2 or 4) are "tilted" from a first position where their axis of rotation is vertical and where the rotors act as a regular helicopter rotors to a second position where their axis of the rotation is relatively horizontal and the rotors act as propellers producing forward thrust. A tilt rotor type rotorcraft converts from helicopter mode to airplane mode (wing borne with propellers) after vertical take-off and converts back to helicopter mode for hover or vertical landing.

The best-known tilt rotor rotorcraft is the V-22 Osprey. The V-22 Osprey uses 2-speed rotors, a 412 RPM for helicopter mode and for conversion to airplane mode and 333 RPM when the rotors are locked in propeller mode for forward flight.

The experimental predecessor to the V-22, the XV-15, attempted the same type of 2-speed rotor but was not successful in achieving such 2-speed because of rotor dynamics, which caused high vibration and loads at RPM other than 100%.

The constant RPM or the close-ratio (100% and 81%) RPMs of the current tilt rotors result in excessive RPM in forward flight and excessive blade "twist" (variance of blade angle at the tip of the blade vs. the angle at the root of the blade) for hover flight. Both of these limit the performance and efficiency of the current tilt rotors. As such, there is a need for a tilt rotor system which will improve the tilt rotor type rotorcraft maximum hover weight, cruise range, altitude and speed performance while reducing fuel consumption and noise levels.

SUMMARY OF THE INVENTION

The present invention provides a variable speed tilt rotor and a method for using the same for improving tilt rotor rotorcraft performance and efficiency while reducing fuel consumption. Both in helicopter mode and in airplane mode, the RPM of the rotor system of the present invention can be varied to multiple and even infinite settings depending on the rotorcraft flight conditions to maintain a blade loading for optimum performance and fuel efficiency. In helicopter mode, the present invention allows for reduced rotor RPM at reduced forward speeds achieving an increase in rotor blade lift coefficient at the lower forward speeds and higher blade lift to drag ratio and thus, higher aerodynamic efficiency, lower required power, fuel consumption and noise level. By decreasing the RPM of the rotor, the power required to drive the rotor at the decreased RPM is also decreased. The adjustment to rotor RPM and power can be accomplished manually or automatically as for example by computer.

In airplane mode, the present invention allows a major reduction in RPM and increase in propeller efficiency, rotorcraft endurance, range, altitude and speed. The current invention allows dramatic reduction of the weight of the rotor blades, which makes possible large rotor diameters unachievable with current rotors. The combination of very low RPM in airplane mode and the low blade mass virtually eliminates whirl mode flutter and therefore allows for higher efficiency wings (larger span and narrower chord), thereby further increasing endurance, range, altitude and reducing fuel consumption and noise levels.

In order to be able to operate over a wide RPM range, the tilt rotor system of the present invention is designed to be able to operate close to or on rotor excitation frequencies. To achieve such unique capability, the rotor blades are designed to be stiff and extremely lightweight. The blades should be substantially lighter than conventional rotor blades.

In an exemplary embodiment, the tilt rotor blades flap, lag and torsion stiffness as well as the blade weight per unit length are continuously decreasing from the blade root to the blade tip. Applicant discovered that to achieve efficient operation at a wide range of tilt rotor angular velocities, the blades of the present invention preferably have a flap stiffness and a blade weight as follows:

Flap Stiffness: $EI_{flap} \geq 200\ D^4$ at 30% of rotor radius measured from the center of rotor rotation Total Blade Weight: $W \leq 0.0025 D^3$ where D is the rotor diameter and is measured in feet, W is the total weight of each blade in pounds, and EI is in lbs-in².

In the exemplary embodiment, the tilt rotor is not gimbaled, like conventional tilt rotors, but the blades are rigidly attached to the rotor hub in the flap and lag directions (without requiring hinges, elastometers or flexbeams) and the hub is rigidly attached to the mast. A blade bearing system is provided to change the blade angle of incidence around the feathering axis. This non-gimbaled hingeless rotor provides for substantial increase in rotor control moments using cyclic controls. Cyclic control is the control of the blades on the one side of the rotor disc to provide higher lift/thrust than those on the other side by changing the angle of incidence of the blades around the feathering axis. The OSTR provides for higher rotor control moments in the pitch and roll directions in helicopter mode and in the pitch and yaw directions in airplane mode and thus for substantial increase in rotorcraft maneuver and for flight with wider range of the rotorcraft center of gravity. The powerful control capability in pitch and yaw in airplane and conversion modes makes the tail unit, both vertical fin and horizontal tail, completely unnecessary or they can be drastically reduced in size with a resulting substantial reduction in rotorcraft weight and drag.

Another advantage of high stiffness OSTR rotor is that it enables the additional use of Individual Blade Pitch Control (IBPC) to provide gust and rotor load alleviation.

BRIEF DESCRIPTION OF THE DRAWINGS

FIGS. 4A, 4B, and 4C are top, side and end views, respectively, of an exemplary embodiment blade of the present invention.

FIG. 5A is a table depicting design data for the exemplary embodiment blade shown in FIG. 4A.

FIG. 5B is a cross-sectional view of the shank of the exemplary embodiment blade shown in FIG. 4A.

FIG. 5C is a cross-sectional view of the exemplary embodiment blade shown in FIG. 4A at the blade 20% station.

FIG. 5D is a cross-sectional view of the exemplary embodiment blade shown in FIG. 4A at the blade 70% station.

FIG. 7A depicts a table comparing the exemplary embodiment blade shown in FIG. 4A to a conventional blade for use on a gimbaled tilt rotor.

FIG. 7B depicts a further table comparing the exemplary embodiment blade shown in FIG. 4A to a conventional blade for use on a gimbaled tilt rotor.

DETAILED DESCRIPTION OF THE INVENTION

The present invention provides for an optimum speed tilt rotor whose RPM can be varied to multiple and even infinite settings depending on the helicopter flight conditions for optimum flight performance. U.S. Pat. No. 6,007,298 attached hereto as Appendix A is fully incorporated herein by reference.

The optimum speed tilt rotor system of the present invention when incorporated on tilt rotor rotorcraft allows for a substantial improvement in range, altitude and airspeed with less fuel consumption and noise levels. For descriptive purposes, an exemplary embodiment optimum speed rotor system of the present invention is referred to herein as Optimum Speed Tilt Rotor or OSTR. The OSTR can be driven by any powerplant such as a reciprocating engine or a turbine engine.

The present invention allows for reduced rotor RPM at reduced forward speeds and/or at reduced rotor lift achieving an increase in rotor blade lift coefficient and higher blade lift to drag ratio and thus, higher aerodynamic efficiency, lower required power, fuel consumption and noise level. The present invention OSTR is able to accomplish this while in helicopter mode, in airplane mode and during conversion from one mode to the other.

Because the lift coefficient of a rotor blade varies along the blade length as well as with the blade angular position while in helicopter mode, it is common to evaluate the lift characteristics of a rotor blade by ascertaining its loading. Blade loading ($C_T/\sigma$) is a parameter which is a function of the rotor blade average lift coefficient ($C_L$) and is defined by the equation:

$$C_T = \frac{T}{S\sigma\rho V_T^2} \quad (4)$$

where T=rotor thrust, S=rotor disc area, $V_T$=rotor tip speed

T is approximated at T=nW where n is the vertical maneuver factor and W is the helicopter weight. The solidity factor, $\sigma$, is the ratio of weighted total blade area to the rotor disc area.

$$V_T = \frac{2\pi R(RPM)}{60} \quad (5)$$

Figure 1:
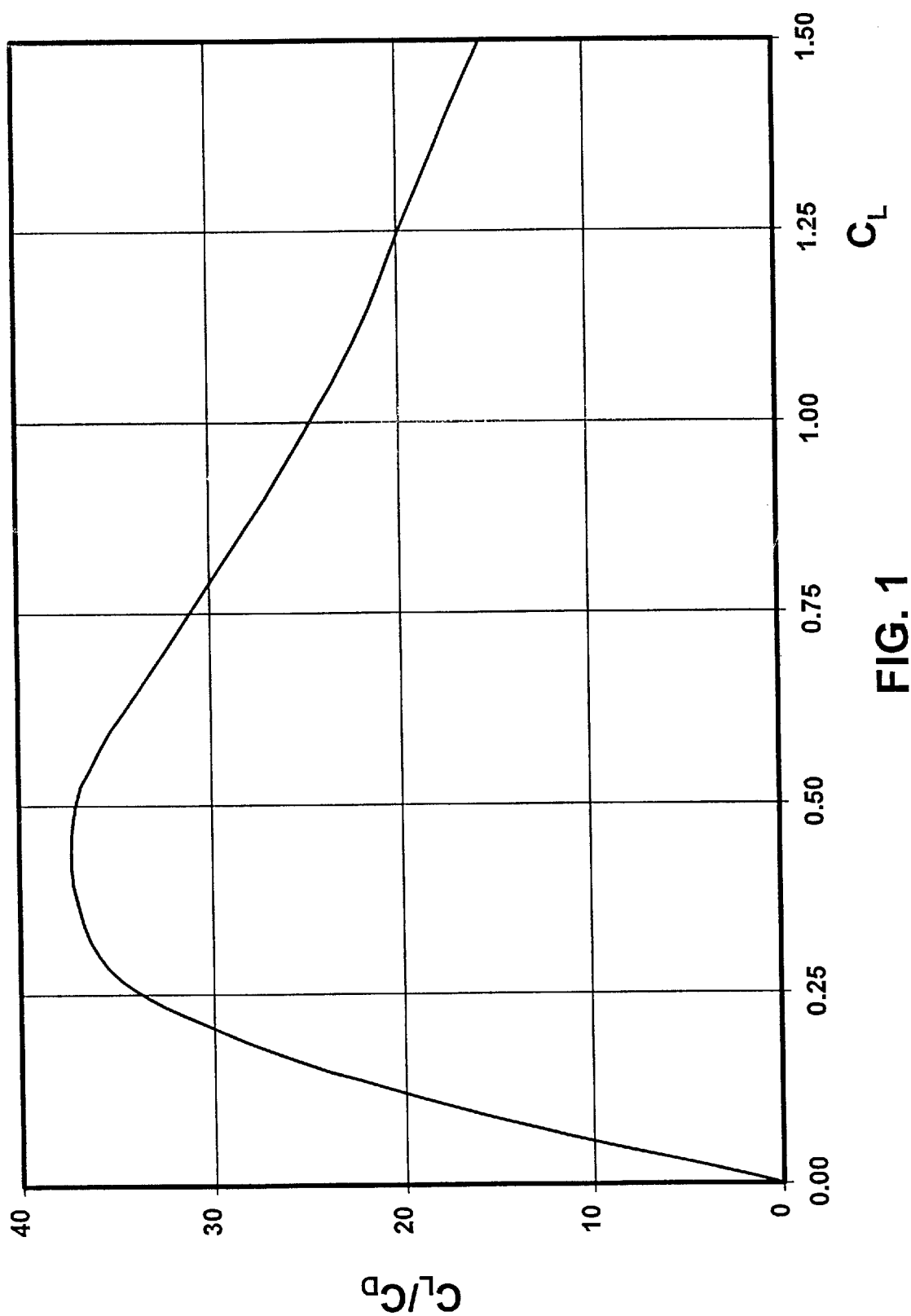
FIG. 1 depicts a graph the ratio of Coefficient of Lift to Coefficient of Drag v. Coefficient of Lift for a typical airfoil.
Figure 2:
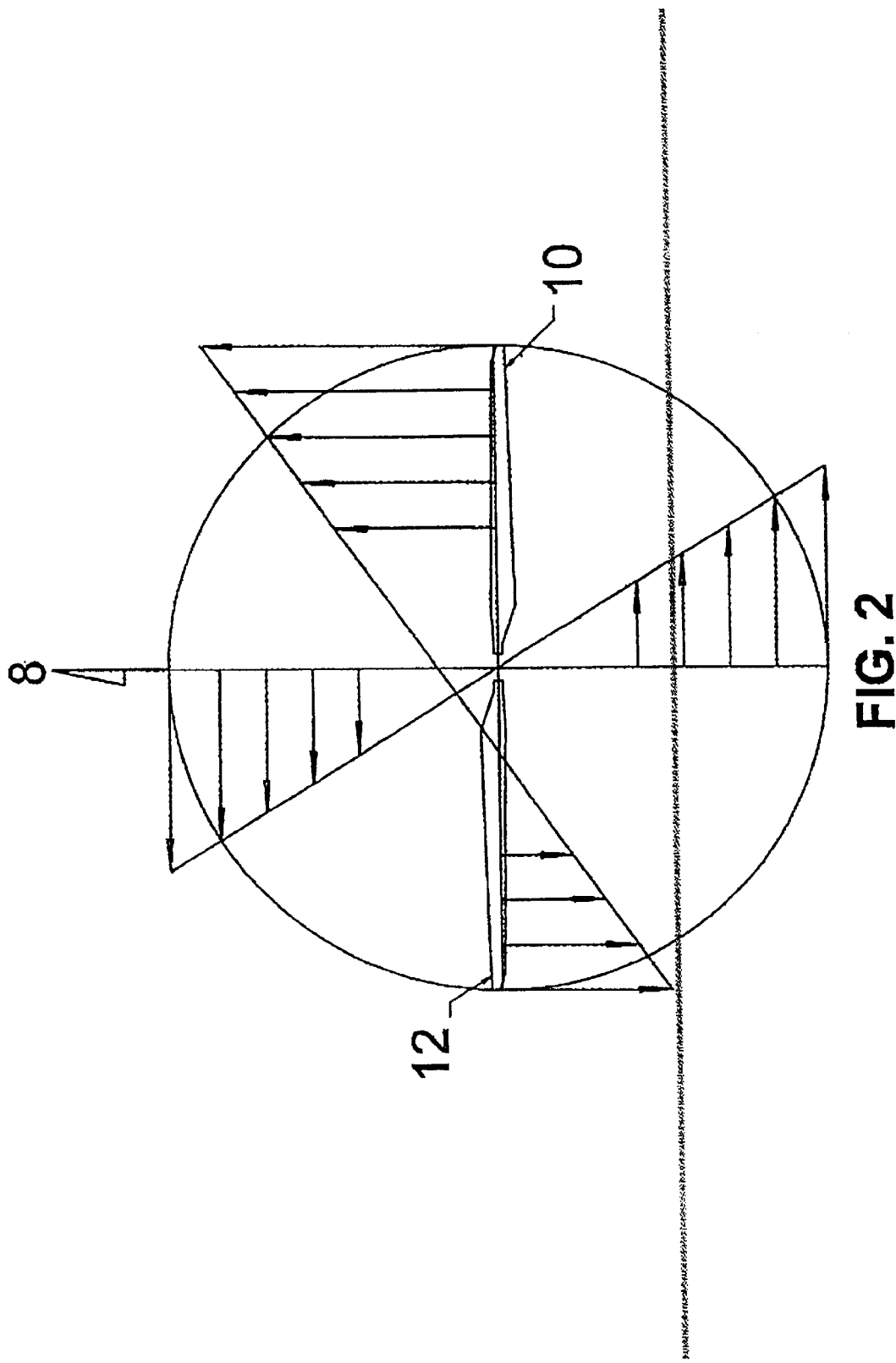
FIG. 2 is a schematic of an airspeed distribution of rotor in edgewise forward flight (helicopter mode).
Figure 3:
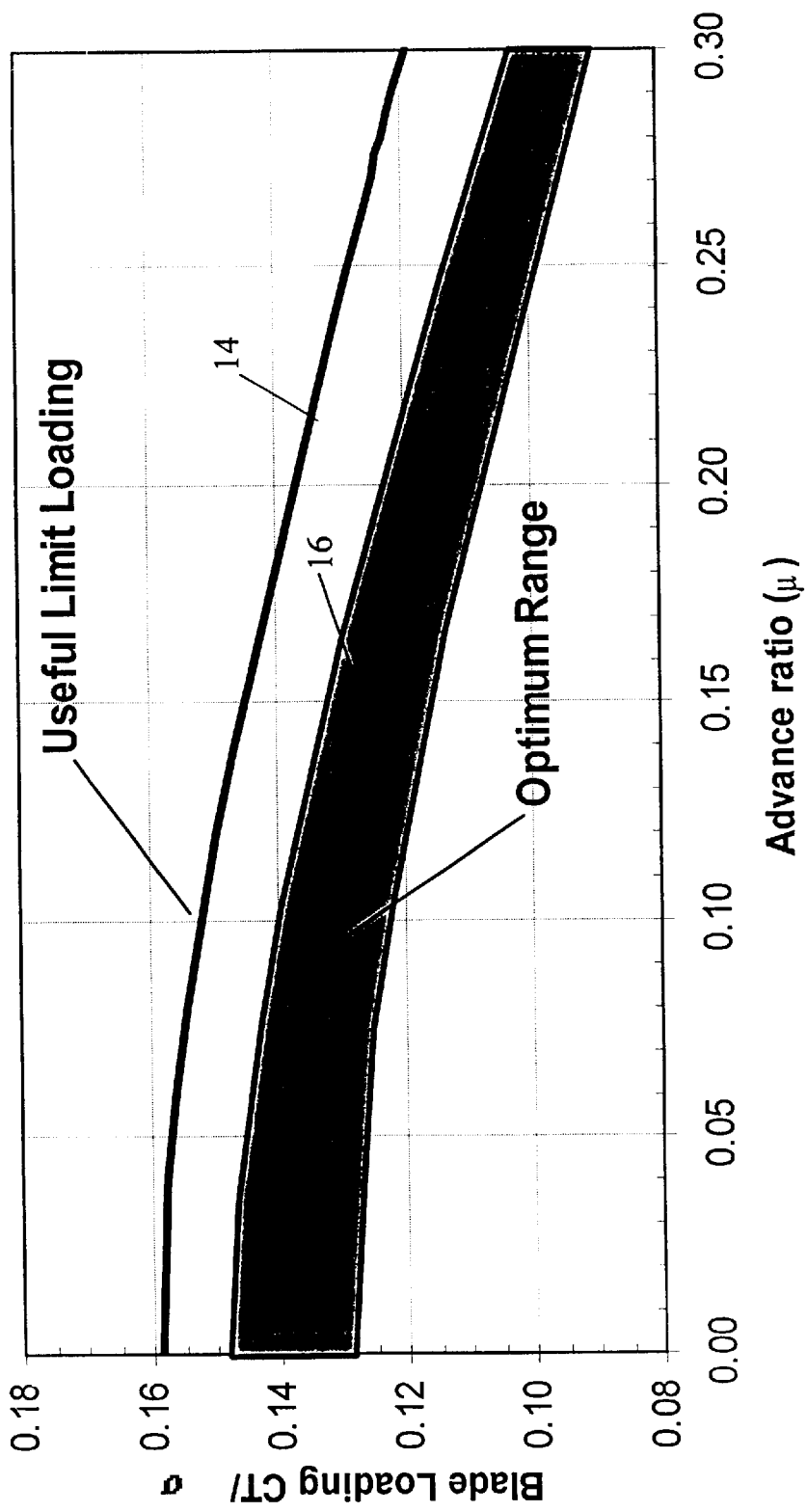
FIG. 3 depicts a graph of Blade Loading v. Advance Ratio showing a useful limit blade loading and an optimum range of blade loadings for a typical tilt rotor in helicopter mode.

The term "blade loading" or "rotor blade loading" as used herein refers to $C_T/\sigma$. The useful limit of blade loading for any helicopter rotor system can be derived experimentally, i.e., through flight testing. The useful limit blade loading for a typical tilt rotor system in helicopter mode is given in FIG. 3 by curve 14 as function of the helicopter advance ratio $\mu$, i.e., the ratio of helicopter forward speed to the rotor tip rotational tip speed $V_T$. As can be seen from FIG. 3, at advance ratios greater than 0.1, there is a decline of blade loading limit. An optimum range 16 of blade loading can also be derived through flight test for a specific helicopter rotor system as a function of advance ratio as shown in FIG. 3. For a given advance ratio, the optimum blade loading range is defined by the blade loadings required to optimize the various flight performance parameters such as endurance and climb rate in helicopter mode.

Similarly, in airplane mode, the blade loading required to achieve the desired forward thrust at a certain rotorcraft weight, speed, rate of climb and flight altitude defines the blade lift/drag ratio and thus the rotor propulsive efficiency. To achieve a high propeller efficiency, many propeller driven fixed-wing aircraft use variable pitch propellers and vary the propeller RPM to achieve optimum blade loading. But, the conventional tilt-rotors have fixed RPM in airplane mode because of the severe dynamic loads resulting from varying the RPM of a conventional tilt rotor.

The OSTR of the present invention allows for the adjustment to the tilt rotor RPM to maintain a blade loading within the optimum range. By operating below 100% of RPM, the power required to drive the rotor at the decreased RPM is also decreased. The adjustment to tilt rotor RPM and power can be accomplished manually or automatically as for example by computer. In a manual OSTR system, for best endurance, the pilot will manually adjust the tilt rotor RPM and engine power to minimize fuel consumption (either directly measured or by observing an indication of engine power). For best cruise range, the pilot will adjust RPM and airspeed for maximizing the miles traveled per unit of fuel. In climb at a given power setting, the pilot will adjust the tilt rotor RPM and airspeed for maximizing the climb rate. An automated OSTR will operate the same way. Information such as fuel consumption and miles traveled per unit of fuel consumed will be monitored by the computer. The pilot will select the flight performance parameter that needs to be optimized, e.g., range, endurance, rate of climb, etc. and the computer will adjust the tilt rotor RPM, power and airspeed settings accordingly for maximizing the selected performance. Alternatively, the optimum blade loading range as a function of advance ratio is predetermined from flight testing and stored on the computer which in turn will adjust the tilt rotor RPM and power settings so as to maintain the blade loading within the predetermined range for any pilot controlled airspeed and rate of climb.

Applicant discovered that the structural dynamics problems associated with significant changes of tilt rotor RPM can be overcome by building a rotor system consisting of blades 18 having reduced mass and increased stiffness (FIGS. 4A, 4B, 4C and 10). Applicant was able to design a blade having a continuously decreasing flap, lag and torsion stiffness from the root 20 to the tip 22 of the blade and having continuously decreasing mass from the root to the tip of the blade. The flap 24, lag 26 and torsional 28 directions are depicted in FIGS. 4B, 4A and 4C, respectively. These blades when mounted on a rotor hub allow for significant changes in rotor RPM without being subject to the structural dynamics problems of conventional blades. An exemplary embodiment of such a blade as shown in FIGS. 4A, 4B and 4C is made of a carbon-epoxy advanced composite material.

In order to be able to operate over a wide RPM range, the OSTR is designed specifically to be able to operate close to or on rotor excitation frequencies. The OSTR is capable of operating a long time under full rotor lift load at or near such frequencies. To achieve such unique capability, the OSTR rotor blades are designed to be stiff and very lightweight. By decreasing the blade weight and increasing the stiffness of the blades in flap in relation to the feathering axis 30 (FIG. 4A), the blade is better able to operate at or near the rotor excitation frequencies. Lag stiffness tends to be less sensitive to the excitation frequencies but if kept at a ratio to flap stiffness of on average greater than 2 it helps reduce oscillatory lag loads and helicopter vibration levels.

The OSTR rotor blades are stiff and substantially lighter than conventional rotor blades. Applicant discovered that to achieve operation at a wide range of angular velocities, the OSTR blades preferably have a flap stiffness and a blade weight as follows:

Flap Stiffness: $EI_{flap} \geq 200$ $D^4$ at 30% of rotor radius measured from the center of rotor rotation Total Blade Weight: $W \leq 0.0025 D^3$ where D is the rotor diameter and is measured in ft, W is the total weight of each blade in pounds, and EI is in lbs-in². However, the total weight of each blade W may be less than or equal to the product of $0.004 D^3$. For example, the total weight W of each blade may be less than or equal to the product of $0.003 D^3$, or less than or equal to the product of $0.002 D^3$, or less than or equal to the product of $0.001 D^3$. Furthermore, the flap stiffness $EI_{flap}$ may be as low as the product of 100 $D^4$ at 30% of rotor radius as measured from the center of rotor rotation.

The exemplary OSTR blade of the present invention shown in FIGS. 4A, 4B and 4C has a length 32 including the shank 33 of about 15 feet, a maximum width 34 of about 21.2 inches and a minimum width 36 at its tip of about 4.36 inches (FIG. 4A). The blade has a shank length 40 of about 10.3 inches and a shank diameter 42 of about 5.81 inches. The exemplary blade has the dimensions (in.), stiffness (lbs-in$^2$) and weights per unit length (lbs/in.) depicted in table of FIG. 5A. As can be seen from FIG. 5A, the exemplary blade has a continuously reducing flap, lag and torsional stiffness from the hub center to the blade tip. The blade cross-sections at the blade 20% station 5C—5C, and the 70% station 5D—5D, are depicted in FIGS. 5C and 5D, respectively. The 20% and 70% stations are at 20% and 70% of the rotor radius, respectively, as measured from the center of rotor rotation. The cross-section of the blade shank is depicted in FIG. 5B. The exemplary blade is constructed of a carbon-epoxy spar/shank and a carbon epoxy leading edge. The trailing edge is a lightweight section made of thin carbon-epoxy top and bottom skins and a full-depth honeycomb core.

Figure 6:
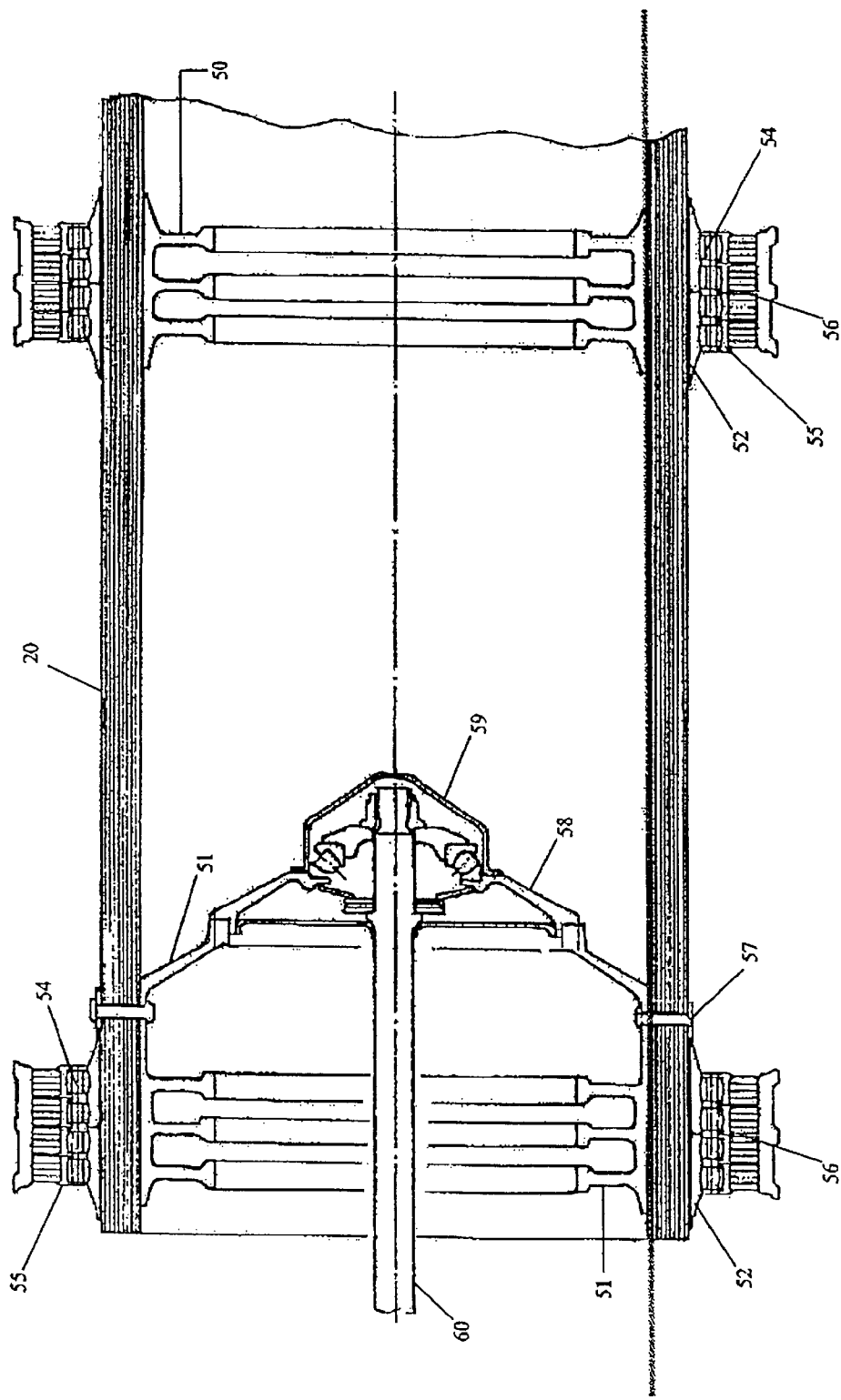
FIG. 6 is a partial cross-sectional view of the shank of the exemplary embodiment blade shown in FIG. 4A mated to a hingeless rotor.

The exemplary OSTR rotor hub is very stiff, non-gimbaled and hingeless. Bearings comprising of rolling elements, as for example, rollers 54 and inner and outer raceways, as for example raceways 52 and 55, respectively, as for example shown in FIG. 6, provide for control of blade pitch around the feathering axis. No blade articulation or flexbeam is used. The OSTR comprises blades having a cylindrical blade shank of carbon epoxy 20 as shown in FIG. 6 which is bonded to an outboard Titanium diaphragm 50 and is bonded and riveted to an inboard Titanium diaphragm 51. Divided inner raceways 52 support four rows of barrel-shaped hollow rollers 54 each at the inboard and outboard bearings. These roller bearings, the individual outer raceways 55 with roller guidance and the hub structure 56 resist moments that are substantially greater than those for a gimbaled rotor system. The blade centrifugal force is resisted by the rivets 57, the inboard diaphragm 51, the conical mounting for the restraint bearing 58, the thrust bearing assembly 59 and the tension bolt 60 attachment to the hub structure.

To demonstrate the advantages of OSTR vs. conventional tilt rotors, a relatively lightweight rotorcraft of 4,000 lbs. empty weight and 8,000 maximum vertical take-off weight, possibly typical for general aviation or unmanned aircraft applications, was selected. While the disc loading for the conventional tilt rotor was assumed at a typical 13.24 lb/feet$^2$ (Bell XV-15, Bell 609) and the wing aspect ratio (ratio of wing span to wing chord) was also typical at 6.12, the wing area was assumed the same for the conventional and the OSTR equipped tilt-rotor (201.3 feet$^2$ to avoid performance variations unrelated to the present invention. The OSTR substantial delay of whirl flutter provides for the OSTR equipped rotorcraft much higher wing aspect ratio. The higher aspect ratio not only provides for higher cruise efficiency in airplane mode but also for a substantially lower rotor download factor in hover of 5.5% vs. 10% for the conventional tilt rotor. The lower download factor is due to the negative lift on the wing because of the rotor downwash in hover and is related to the ratio of rotor diameter to wing chord. Both rotors have 3-blades.

|  | CONVENTIONAL TILT ROTOR | OSTR EQUIPPED TILT ROTOR | RATIO (OSTR/CONV.) |
|---|---|---|---|
| Maximum Vertical Take-off Weight | 8000 lbs | 8000 lbs | 1.0 |
| Rotor Diameter | 19.61 ft | 30 ft | 1.53 |
| Total Disk Area | 604.23 ft$^2$ | 1413.72 ft$^2$ | 2.34 |
| Wing area | 201.3 ft$^2$ | 201.3 ft$^2$ | 1.0 |
| Wing Aspect Ratio | 6.12 | 11.43 | 1.87 |
| Rotor download Factor | 10% | 5.5% | 0.55 |
| Rotor Solidity Factor ($\sigma$) | 0.089 | 0.071 | 0.80 |
| Hover (CT/$\sigma$) | 0.156 | 0.15 | 0.96 |
| Rotor Disc Loading (W/A) | 13.24 lb/ft$^2$ | 5.66 lb/ft$^2$ | 0.43 |
| Wing Loading (W/S) | 39.74 lb/ft$^2$ | 39.74 lb/ft$^2$ | 1.0 |
| RPM hover (Helicopter) | 720 rpm | 230–360 rpm | 0.32–0.50 |
| Rotor Tip Speed-Hover | 740 ft/s | 361–565 ft/s | 0.49–0.76 |
| RPM prop (airplane) | 583 rpm | 75–180 rpm | 0.13–0.31 |
| Rotor tangential tip speed (airplane) | 600 ft/s | 118–283 ft/s | 0.20–0.47 |
| Engine Power (SL) | 1600 hp | 1600 hp | 1.0 |
| Hover ceiling (Out of Ground Effect)* | 8500 ft | 16300 ft | 1.92 |

*at 8,000 lbs.

Although the OSTR is substantially larger in diameter, 30 feet vs. 19.61 feet for the conventional rotor, it is significantly lighter which compensates for the heavier OSTR gearbox resulting from the higher OSTR torque. The exemplary embodiment was tailored for equal engine power, fuselage size and drag and for equal rotor efficiency at maximum speed in airplane mode at 25,000 feet as a conventional tilt rotorcraft. Thus, in the exemplary embodiment, all OSTR advantages were directed toward achieving a higher performance in helicopter mode, in conversion and for most flight conditions in airplane mode at 25,000 feet, but not for higher maximum speed. The OSTR of the present invention, however, may be tailored to achieve a higher maximum speed while reducing the advantages achieved at lower speeds.

The disc area increase of 134% and corresponding reduction of disc loading to 43% and the OSTR variable RPM result in the substantial reduction of rotor tip speed in hover (49% –76% of that for the conventional tilt rotor) and in airplane mode (20%–47%) which offer dramatic reduction in rotor noise levels.

The reduced disc loading and the OSTR optimum speed operation also result in a dramatic increase in maximum altitude (ceiling) in hover out of ground effect at 8,000 lb from 8,500 feet (same as XV-15) to 16,300 feet.

Figure 7C:
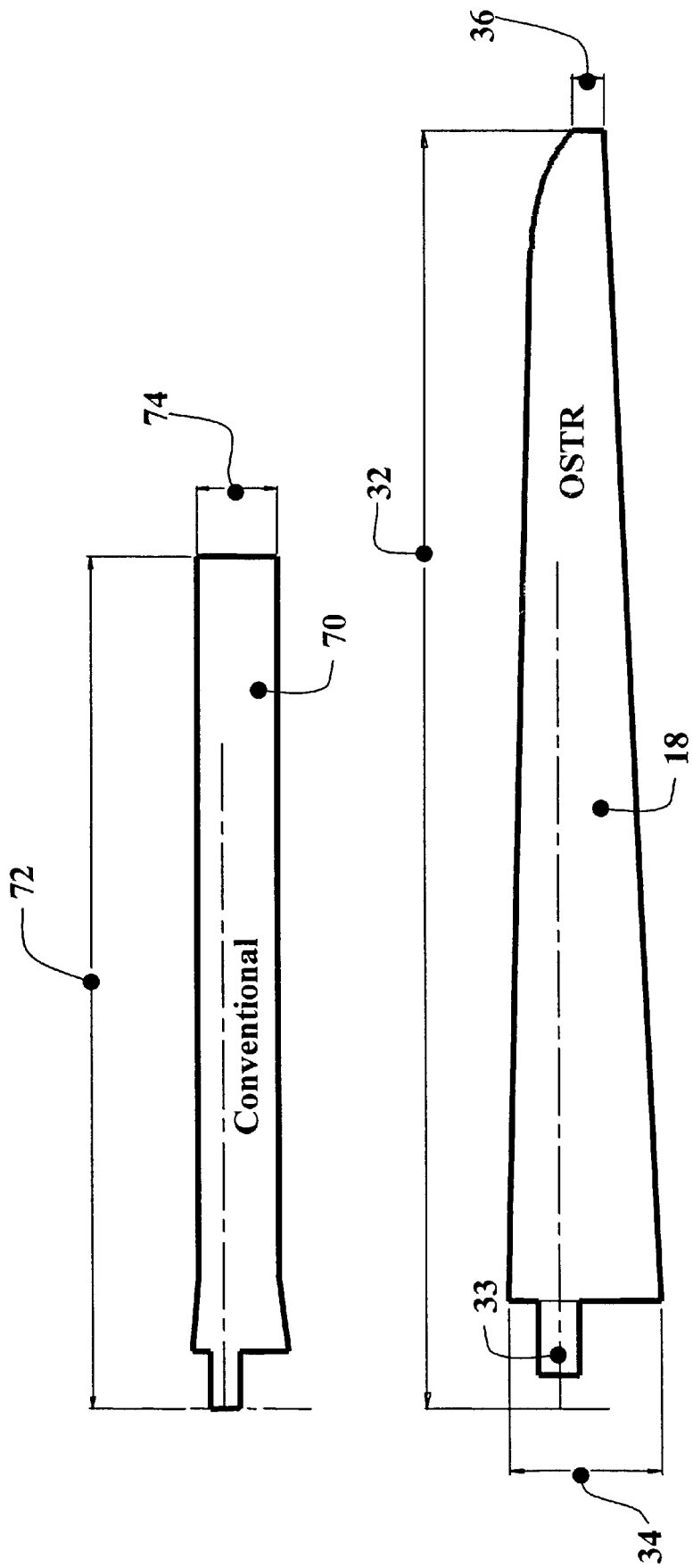
FIG. 7C depicts top views of the two blades in scaled comparison being compared in FIGS. 7A and 7B.

FIGS. 7A and 7B present two tables, respectively, comparing dimensions and design parameters of the exemplary OSTR blade incorporated in a non-gimbaled hingeless rotor to a conventional blade of a gimbaled rotor system. FIG. 7C depicts a scaled comparison between the OSTR blade 18 and the conventional blade 70 being compared in the tables of FIGS. 7A and 7B. The compared conventional blade 70 has a length 72 of about 9.8 feet and a constant width 74 of about 11 inches. As can be seen from FIG. 7A, the OSTR blades are 5.9 fold stiffer at about 10% radius than the conventional articulated rotor blades which are attached to a hub that is gimbaled in flap (blade up-down). In spite of its 5.9 fold increase in stiffness the OSTR blades weight per blade surface area is 30% of that of the conventional blade. This increase in stiffness and reduction in weight per blade surface area is achieved on the OSTR blades by 56% increase in maximum blade thickness (at 30% blade radius) using tapered planform and high stiffness/weight carbon-epoxy materials. The stiff lightweight OSTR blades do not require weights at their tips as do conventional blades.

A rotor system of the present invention can operate from 0 to 100% RPM under full lift load without reducing the rotor structural integrity. Moreover, the vibration levels produced by the rotor of the present invention are within acceptable levels as related to crew fatigue, passenger comfort and payload performance. The rotor systems of the present invention are able to avoid the structural stability, loads and vibration problems associated with the operation of the rotor over a wide range of RPM.

The exemplary embodiment OSTR blades mounted on a hingeless rotor forming an exemplary OSTR were analyzed, optimized and OSTR performance verified using 9 integrated dynamics analysis tools for Computational Fluid Dynamics, structures, structural dynamics and control dynamics. The most important of these tools is CAMRAD II (originated by Wayne Johnson and available Analytical Methods Inc, Redmond, Wash.) was used extensively for evaluating rotor stability (including whirl flutter), rotor loads, performance and control. All performance and structural dynamic data presented are based on CAMRAD II runs with non-uniform inflow. In the extensive CAMRAD II analysis, the exemplary OSTR exhibited no rotor dynamics instability anywhere in the design RPM range.

The CAMRAD II analysis revealed that the exemplary OSTR can reduce its angular velocity to as low as 230 RPM in helicopter mode (tip Mach number of 0.32) and as low as 75 RPM in airplane mode (tangential tip Mach number of 0.11) or at any other interim RPM to optimize lift/drag ratio, reduce power and achieve longer endurance and range or achieve higher altitude and forward speed for the same power level.

Figure 8:
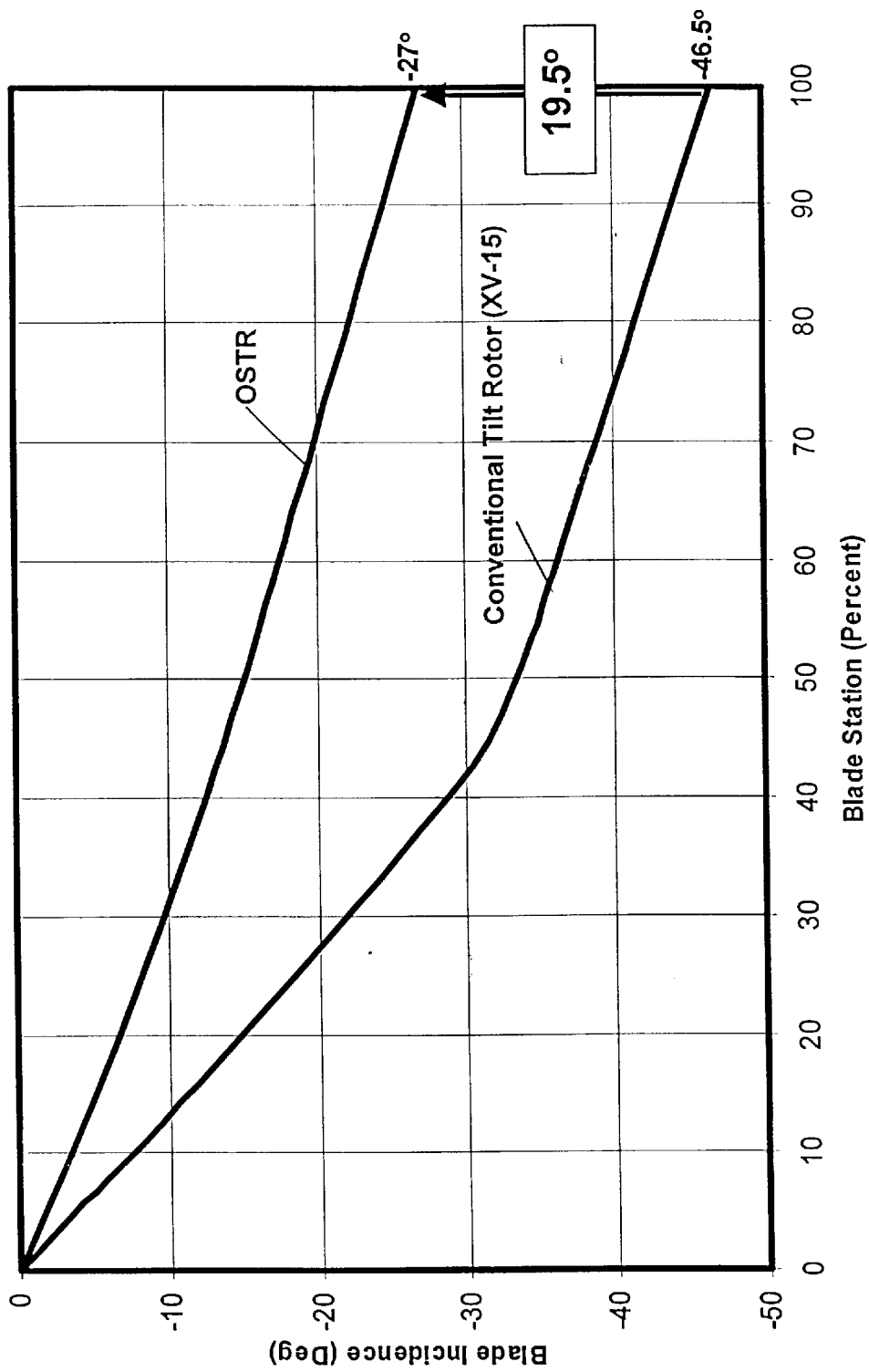
FIG. 8 is a graph comparing the twist of the exemplary embodiment blade shown in FIG. 4A to that of a conventional tilt rotor blade.

FIG. 8 depicts the blade twist (variance of blade incidence angle from root to tip) of the OSTR as compared to a conventional tilt rotor. The key to OSTR performance at high forward speed in airplane mode is its ability to reduce RPM to as low as 180 RPM (50% of maximum hover RPM) at maximum forward speed of 290 knots at 25,000 feet and thus operate at a very high advance ratio which results in a total blade twist (rotor center of rotation to rotor tip) of only 27 degrees vs. 46 degrees for a conventional tilt rotor.

Figure 9:
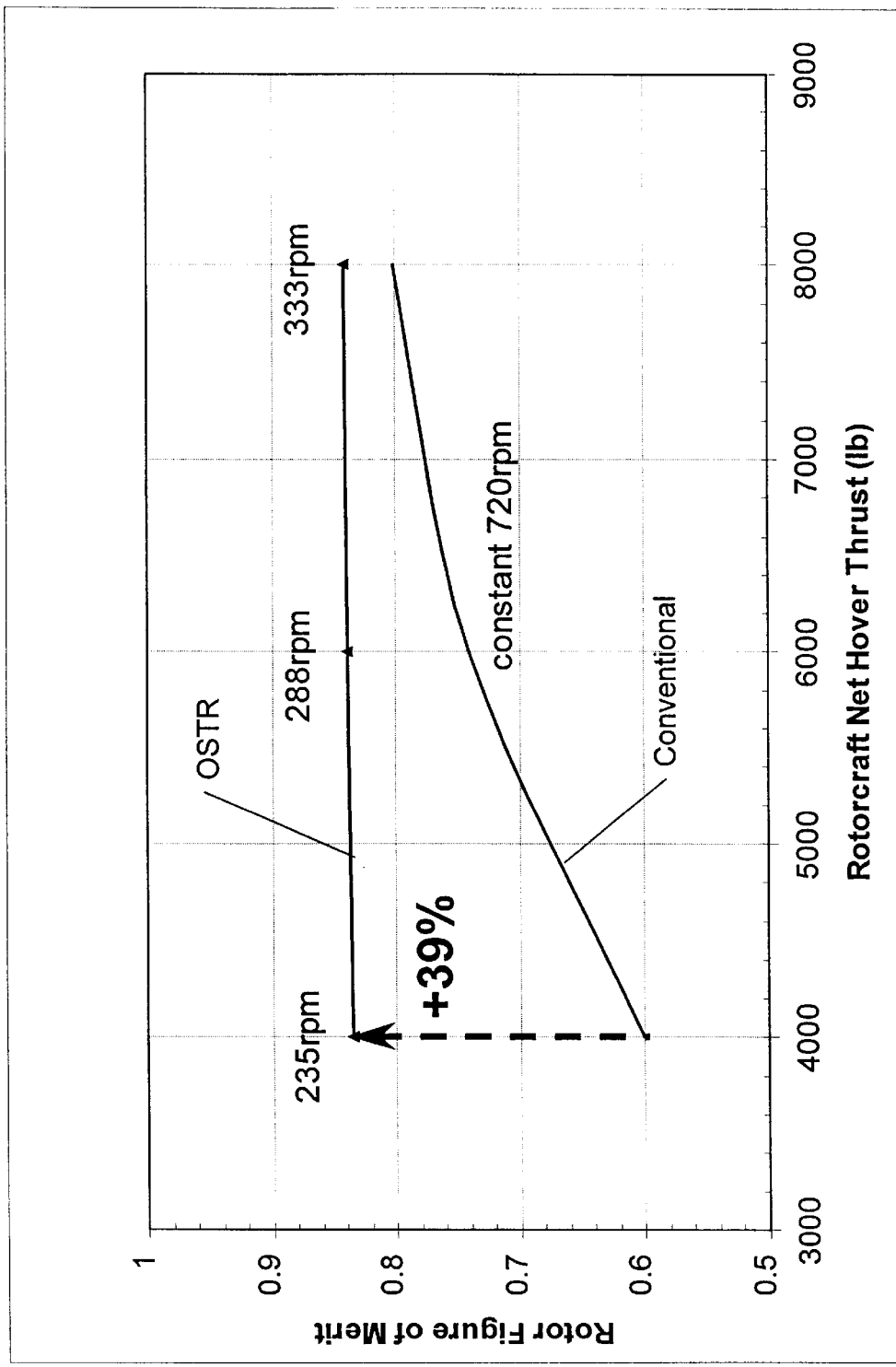
FIG. 9 is a graph comparing the figure of merit in hover at sea level of the exemplary embodiment rotor at variable RPM vs. that of a conventional tilt rotor at a fixed RPM.

FIG. 9 depicts the OSTR hover Figure of Merit as compared to that of the conventional tilt rotor. A rotor Figure of Merit in hover is defined as the ratio of the power required for an ideal rotor which has minimum induced losses, zero profile drag and zero rotational and tip losses to the actual power required for hover. The Figure of Merit of the OSTR at maximum rotorcraft weight (8,000 lbs) is only 5% higher than that of a conventional tilt rotor. But, at reduced weight the improvement is as high as 39%.

Figure 10:
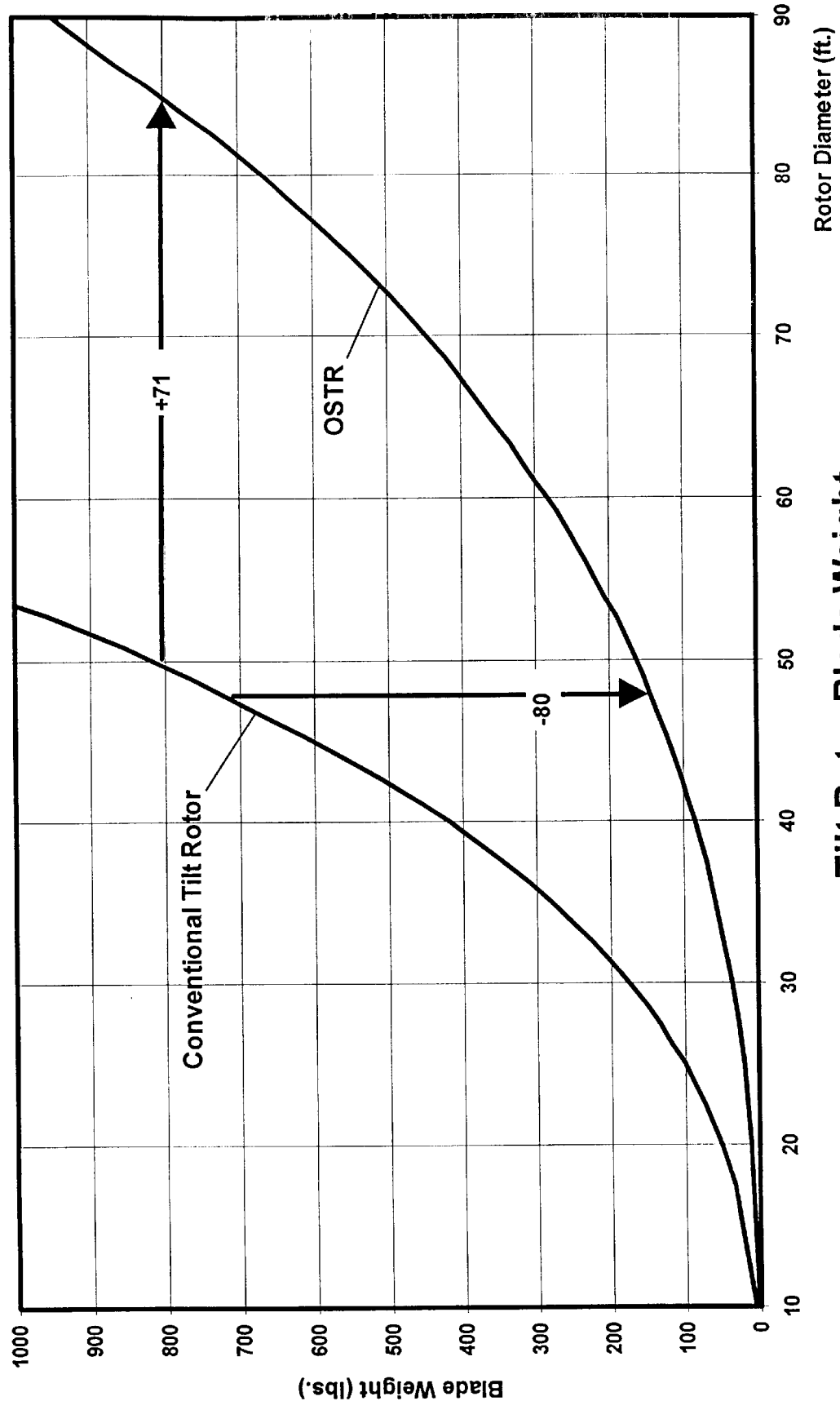
FIG. 10 is a graph comparing the blade weight of the current invention to that of a conventional tilt rotor blade.

FIG. 10 compares the blade weight of an exemplary OSTR to that of a conventional tilt rotor, for various rotor diameters. As can be seen for a given diameter, an 80% reduction in weight is achieved using the exemplary OSTR. For rotor dynamics reasons, rotorcraft rotor blades increase in weight as function of rotor diameter cubed. While the 80% reduction in weight is important even for small rotors, it is critically important in large rotors. As depicted in FIG. 10, the blade of a 90 feet diameter OSTR weighs the same (about 950 lbs) as that of a conventional tilt rotor blade of 52.7 feet diameter. Thus the OSTR makes feasible large rotorcraft which are not considered practical with conventional tilt rotors.

Figure 11:
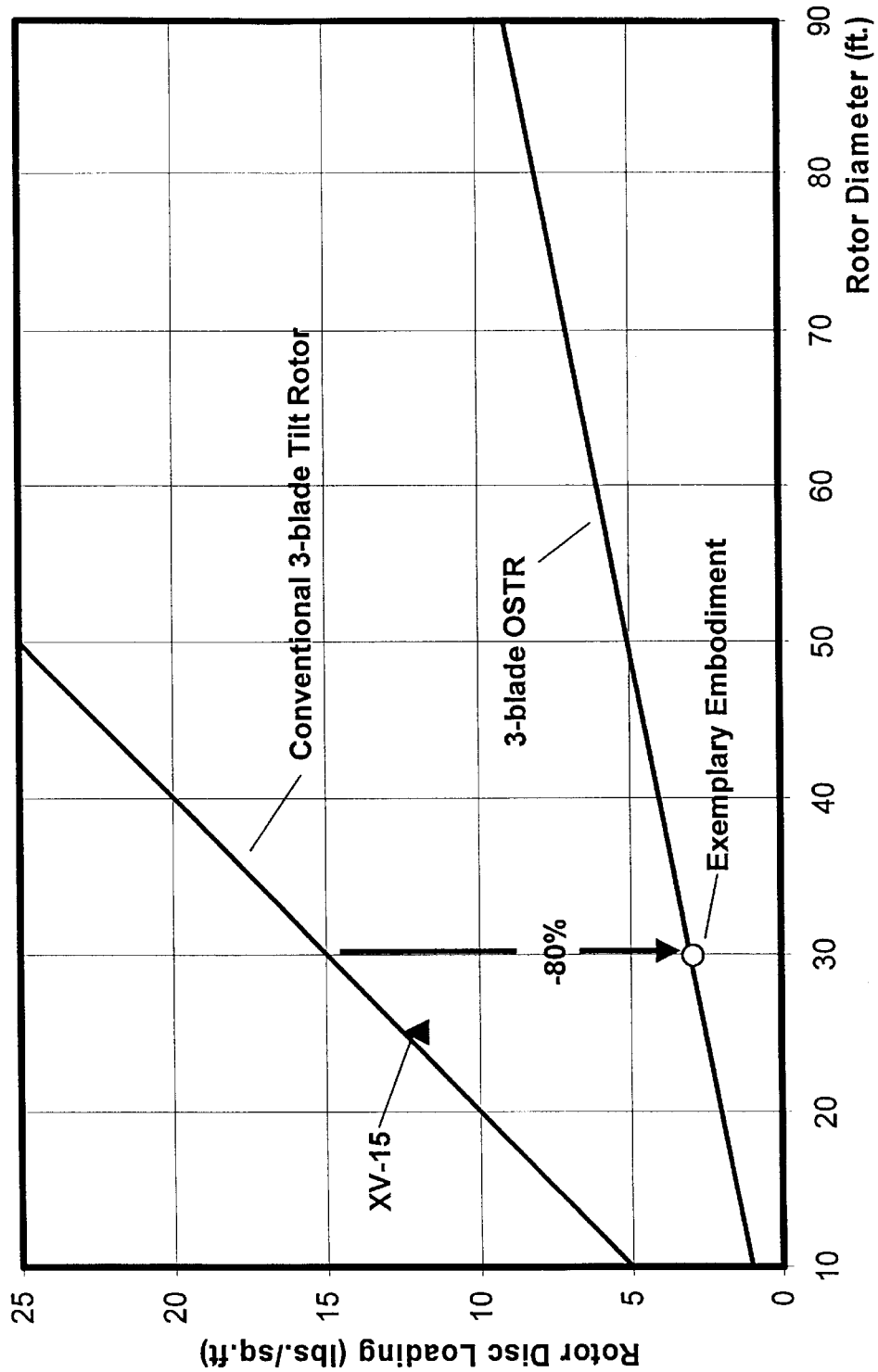
FIG. 11 is a graph comparing the disc loading of a 3-bladed OSTR rotor with a total blade weight of 5% of maximum rotorcraft weight to that of a conventional 3-bladed tilt rotor.

Tilt rotor rotorcraft average a total blade system weight of about 5% of maximum rotorcraft vertical take-off weight. FIG. 11 depicts the rotor disc loading of a rotorcraft equipped with OSTR, with total blades weight of 5% of maximum rotorcraft weight, to that for conventional rotorcraft, both assuming 3-blade rotors. As can be seen from FIG. 11, the rotor disc loading of the OSTR is significantly reduced. While the OSTR can also be built for higher disc loading (smaller diameter and lighter rotors and transmission) the advantages of low disc loading makes this an important design option. The major advantages of low rotor disc loading are reduced power required for vertical take-off, hover and flight in helicopter mode and the reduction of downwash velocity, noise level, and dust level during take-off and landing.

Figure 12:
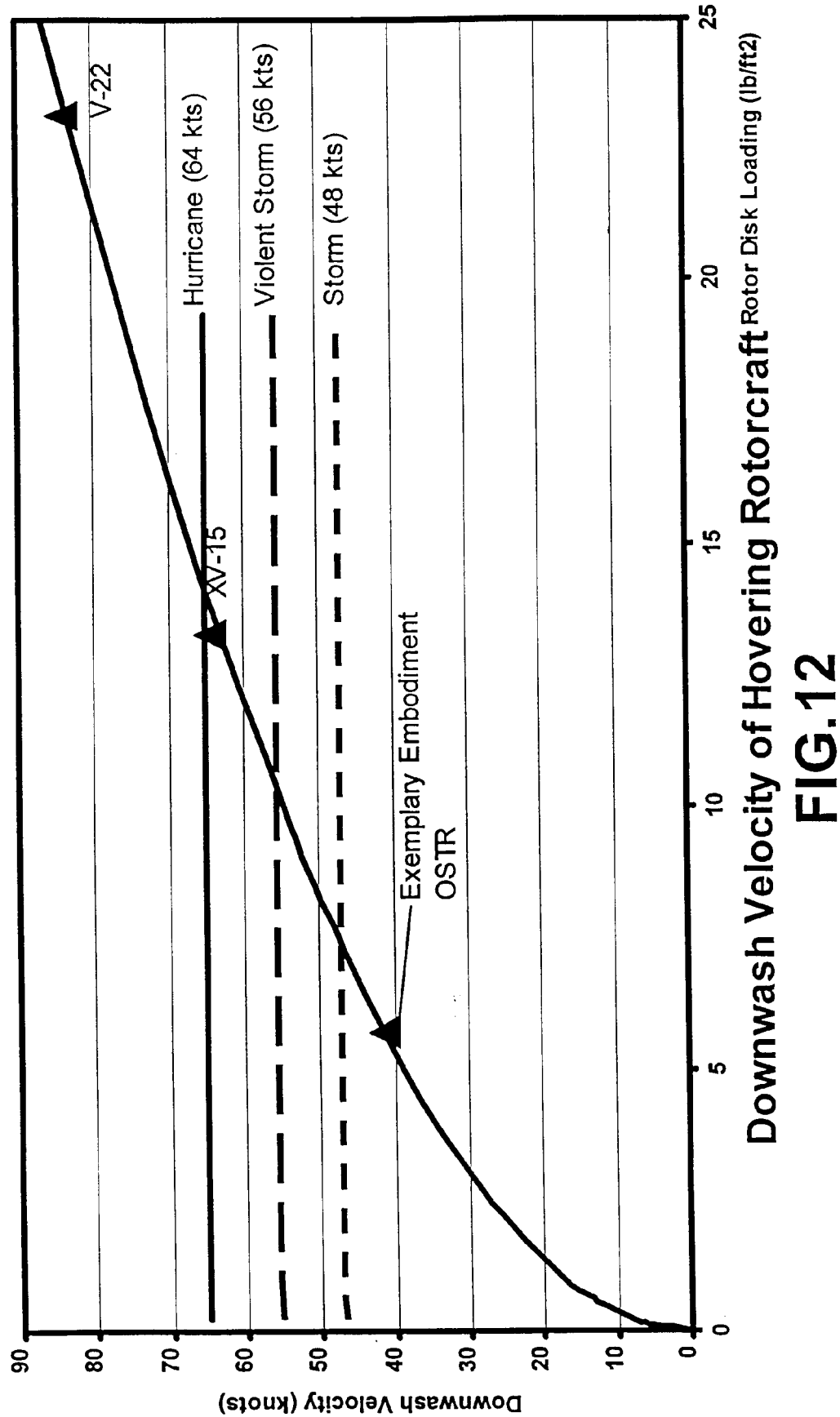
FIG. 12 is a graph showing the effect of rotorcraft disc loading on the rotor downwash velocity in hover.

FIG. 12 depicts the downwash velocity of a hovering rotorcraft as a function of rotor disc loading. The high disc loading of conventional tilt rotors (15–25 lb/feet$^2$) create storm-gale magnitude winds in the immediate vicinity of the hovering tilt rotor rotorcraft and are undesirable because of personnel safety, dust and debris effects.

Figure 13:
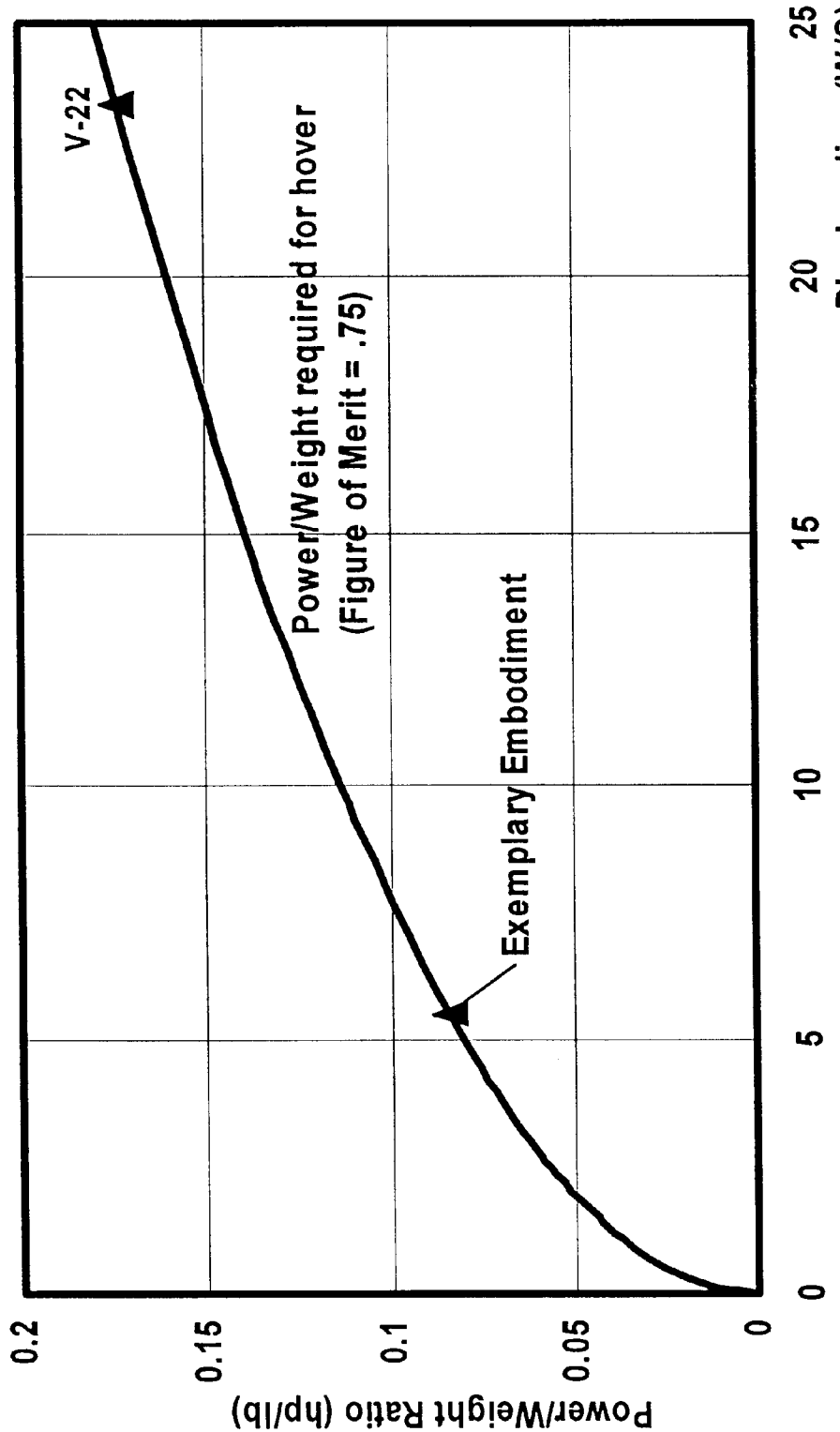
FIG. 13 is a graph showing the effect of rotorcraft disc loading on the rotorcraft power/weight ratio required for hover.

The power required per rotorcraft unit weight, for a rotorcraft during hover is proportional to the square root of the rotor disc loading. FIG. 13 depicts the rotorcraft power to weight ratio required for hover assuming a hover Figure of Merit of 0.75. The V-22 requires over twice the power per pound of rotorcraft weight as compared to the exemplary embodiment rotorcraft.

Figure 14:
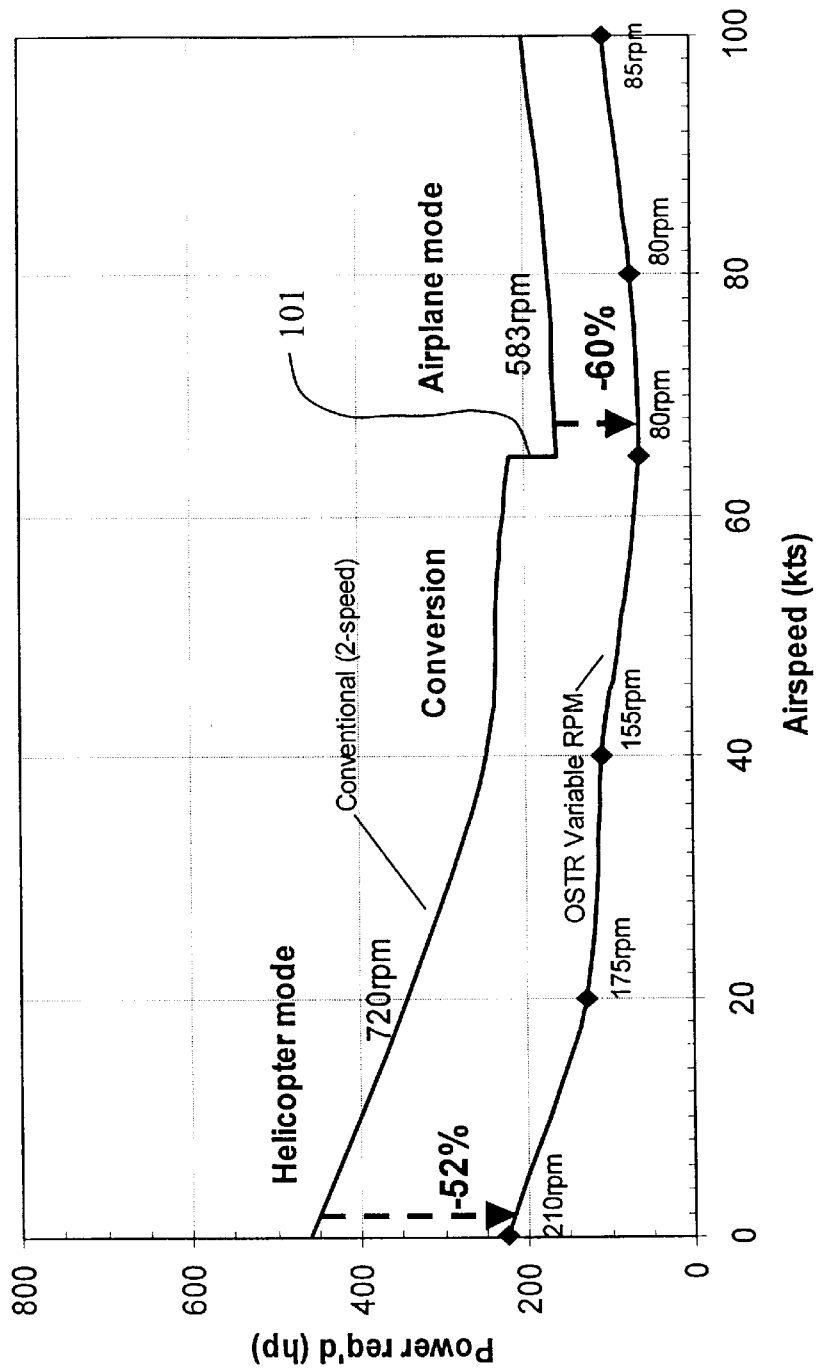
FIG. 14 is a graph comparing the required power for flight in helicopter mode of a tilt rotor rotocraft using the exemplary embodiment rotor at variable RPM at sea level at low weight of 4,000 lbs. vs. that for a rotorcraft using a conventional wing and a 2-speed tilt rotor.
Figure 15:
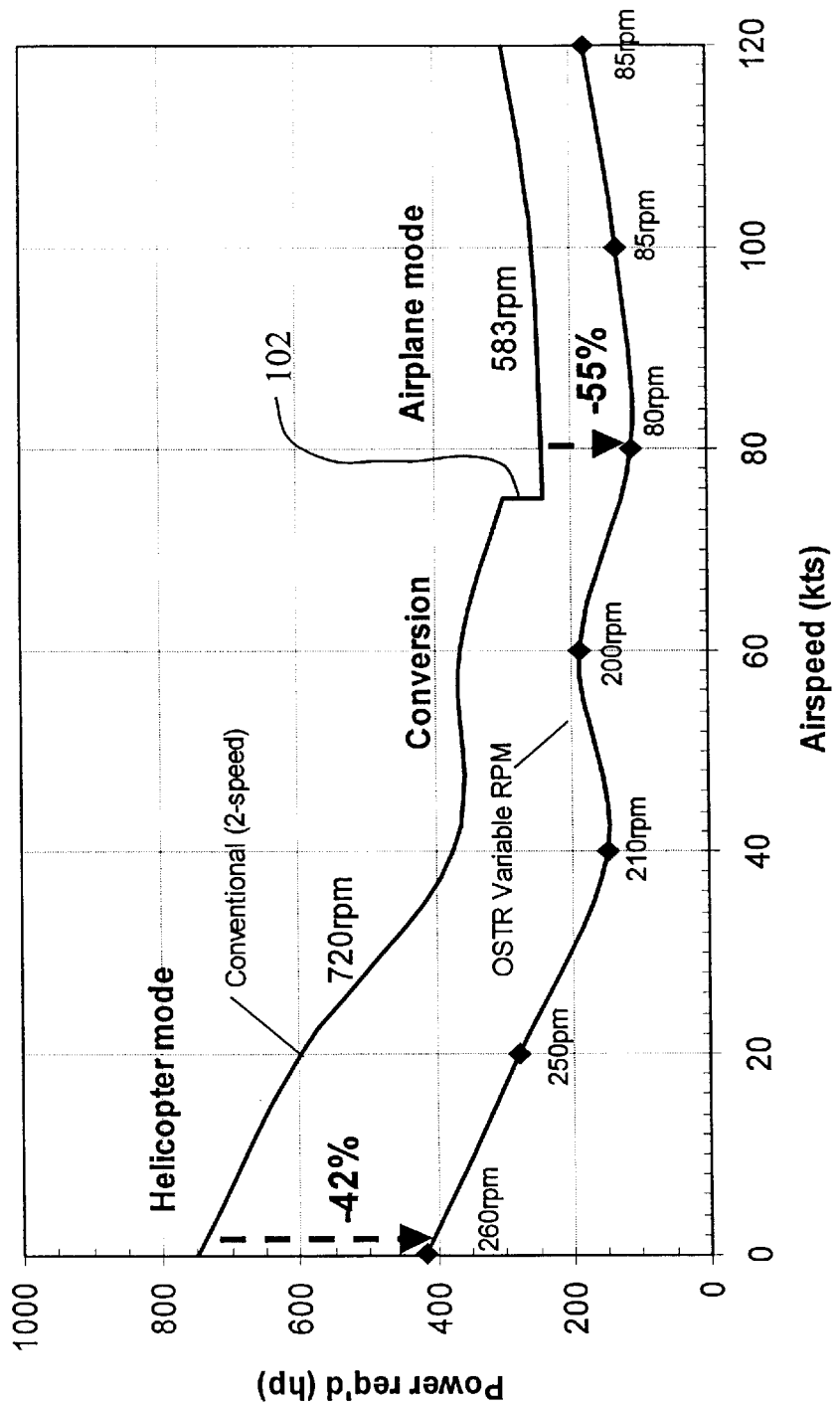
FIG. 15 is a graph comparing the required power for flight in helicopter mode of a tilt rotor aircraft using the exemplary embodiment rotor at variable RPM at sea level at medium weight of 6,000 lbs. vs. that for a rotorcraft using a conventional wing and a 2-speed tilt rotor.
Figure 16:
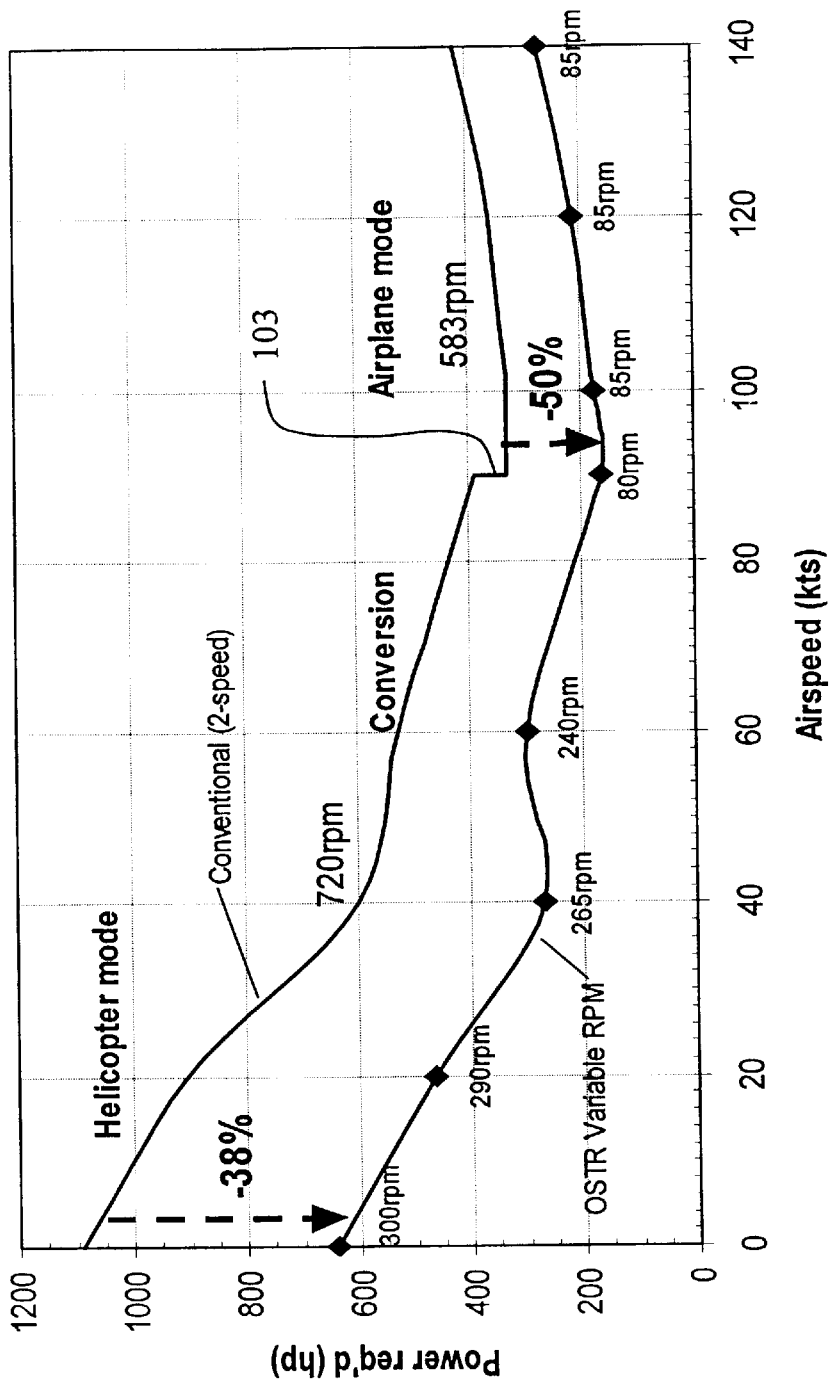
FIG. 16 is a graph comparing the required power for flight in helicopter mode of a tilt rotor aircraft using the exemplary embodiment rotor at variable RPM at sea level at high weight of 8,000 lbs. vs. that for a rotorcraft using a conventional wing and a 2-speed tilt rotor.

FIGS. 14–16 depict power requirements for level flight at sea level when operating the OSTR in helicopter mode and in conversion from helicopter mode to airplane mode, at weights of 4,000 lbs, 6,000 lbs, and 8,000 lbs. The steps 101, 102, and 103 shown in FIG. 14, FIG. 15, and FIG. 16 respectively, depict the reduction in power required with the conventional tilt rotor at the end of conversion to airplane mode and reduction of rotor RPM from 720 to 583 (i.e., a reduction of rotor RPM from 100% to about 81%).

The substantial reduction in power required for hover, 52%, 42%, and 38% at 4,000 lbs, 6,000 lbs and 8,000 lbs respectively, results from the combination of effects of the reduced disc loading (35% reduction in power required) and the higher hover Figure of Merit (FIG. 9) due to OSTR variable RPM operation. The 60%, 55% and 50% at rotorcraft weights of 4,000 lbs, 6,000 lbs and 8,000 lbs, respectively, reduction in required power even after conversion to airplane mode (conventional tilt rotor at the more efficient 583 RPM) is the result of the combination of the effect of OSTR substantially higher rotor efficiency at low power levels because of OSTR ability to operate between 75 RPM and 360 RPM and the effect of the substantially lower rotorcraft wing drag at low forward speed due to the 87% higher wing aspect ratio. Consequently, the exemplary embodiment OSTR of the present invention can operate in a range of RPM levels between 100% and 20%. Thus, the exemplary embodiment OSTR can operate at RPM levels well below the 81% minimum RPM level of conventional tilt rotors.

The advantage of OSTR is dramatic throughout the operation in helicopter mode and during conversion. The OSTR can be designed to achieve higher performance (hover ceiling, rate of climb, acceleration, maneuver, etc.), or to have a lower noise level, lower fuel consumption, longer endurance and longer engine life, or to carry higher weight payload and fuel or to reduce the size of the engines installed for similar performance to that with the conventional tilt rotor and accept a small reduction in maximum cruise speed.

The powerful control capability in pitch and yaw in airplane and conversion modes may make the tail unit, both vertical fin and horizontal tail, completely unnecessary or can result in the drastic reduction in size of the tail unit vertical fin and horizontal tail resulting in substantial reduction in rotorcraft weight and drag. Additionally, the OSTR substantially lighter blades provide for substantial reduction in weight (increase in performance) and cost of rotorcraft using OSTR.

The reduction of 40%–60% in required power as compared to conventional tilt rotors provides an equal reduction in fuel consumption. The 36%–67% reduction in rotor tip speed in helicopter and conversion modes and the 78% reduction in rotor tangential tip speeds in low speed airplane mode when compared to conventional tilt rotors give the rotorcraft incorporating the OSTR of the present invention both the low fuel consumption (long endurance) and the very low noise level necessary to operate at low altitude in a civilian heliport "holding pattern" or as a helicopter over an urban area.

Figure 17:
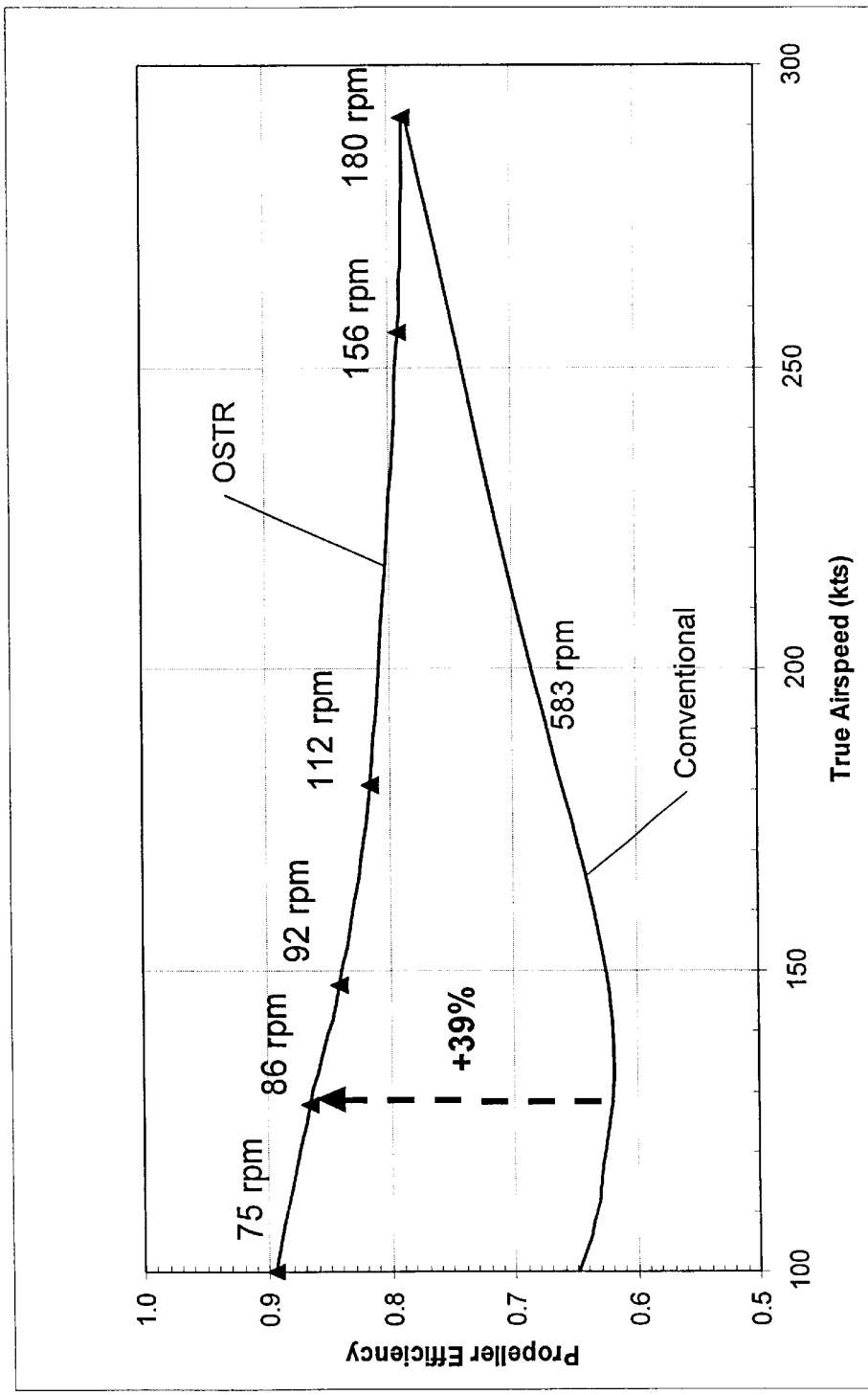
FIG. 17 is a graph comparing the rotor efficiency in airplane mode level flight of the exemplary embodiment rotor at variable RPM at 25,000 feet at low weight of 4,000 lbs. vs. that for a rotorcraft using a constant speed tilt rotor.
Figure 18:
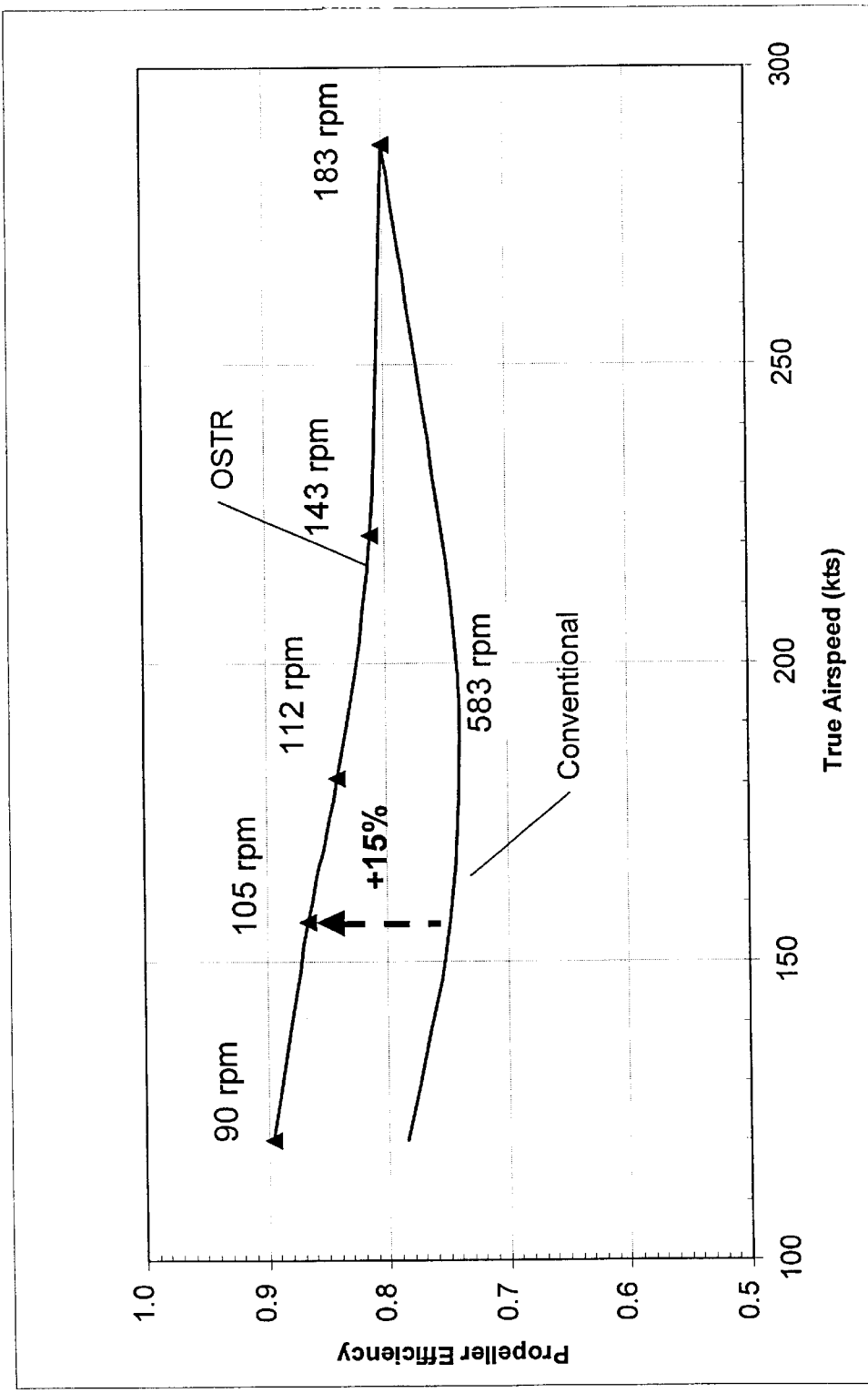
FIG. 18 is a graph comparing the rotor efficiency in airplane mode level flight of the exemplary embodiment rotor at variable RPM at 25,000 feet at medium weight of 6,000 lbs. vs. that for a rotorcraft using a constant speed tilt rotor.
Figure 19:
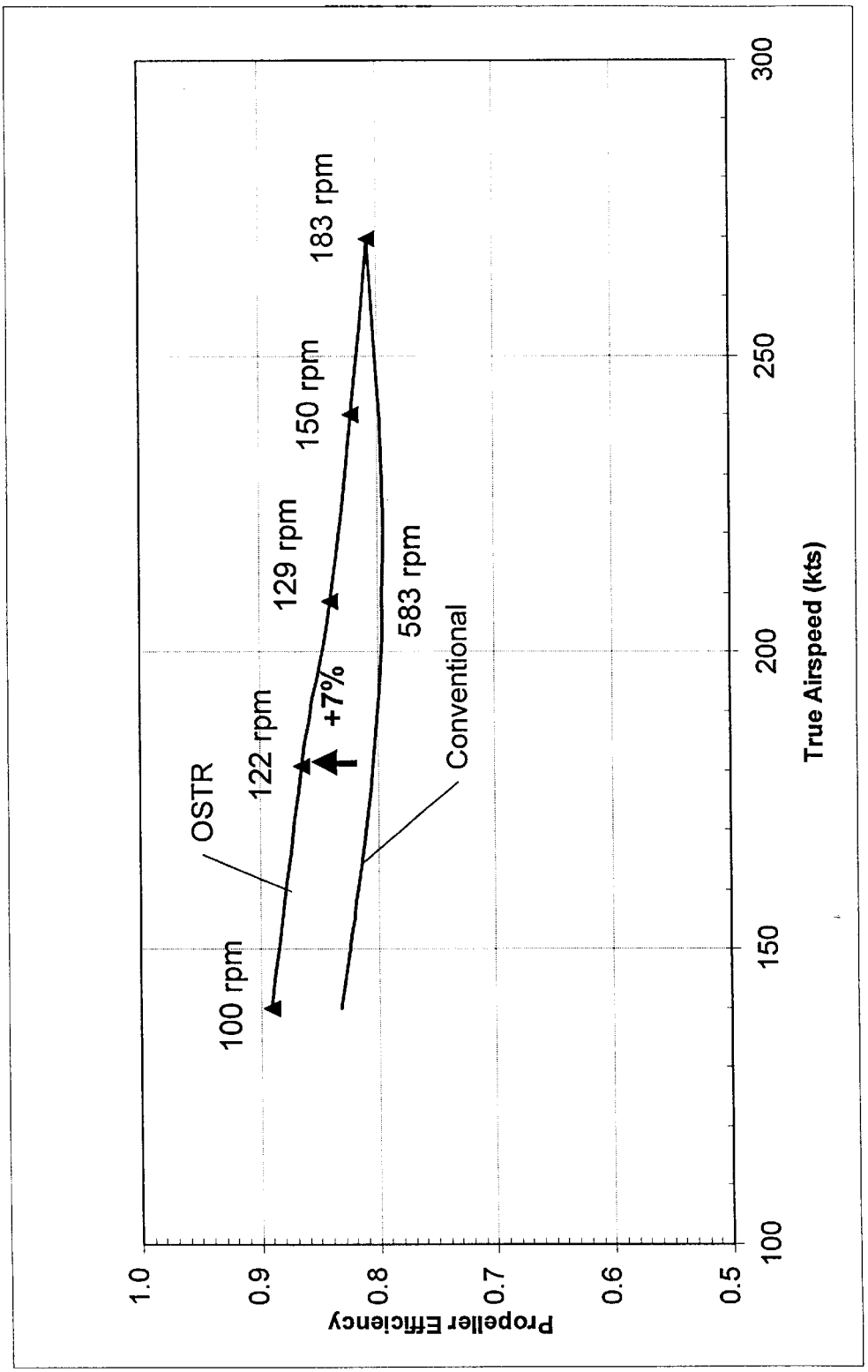
FIG. 19 is a graph comparing the rotor efficiency in airplane mode level flight of the exemplary embodiment rotor at variable RPM at 25,000 feet at high weight of 8,000 lbs. vs. that for a rotorcraft using a constant speed tilt rotor.
Figure 20:
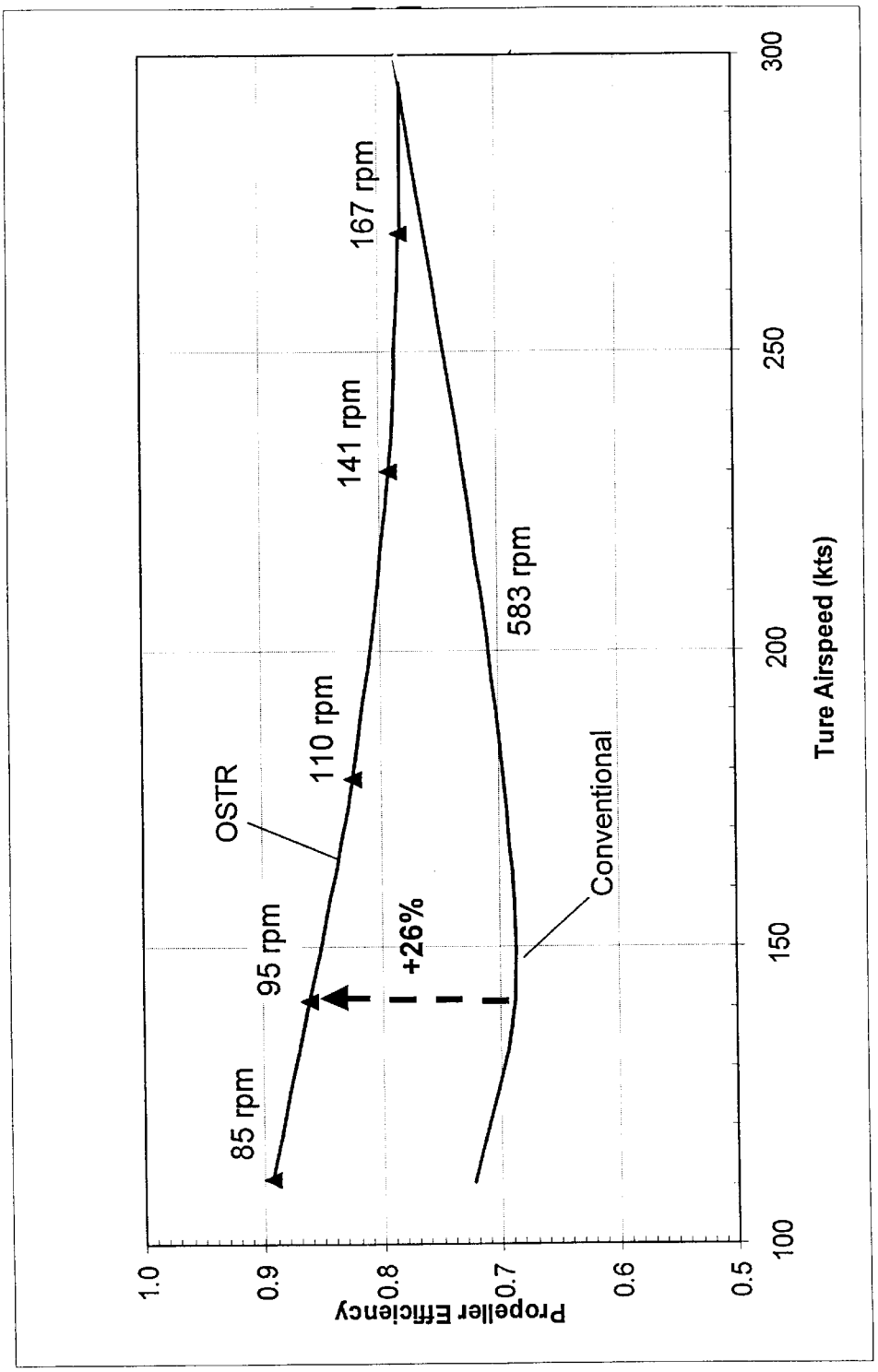
FIG. 20 is a graph comparing the rotor efficiency in airplane mode level flight of the exemplary embodiment rotor at variable RPM at 10,000 feet at high weight of 8,000 lbs. vs. that for a rotorcraft using a constant speed tilt rotor.

FIGS. 17–19 depict the rotor efficiency of the exemplary embodiment OSTR as compared to a conventional tilt rotor at 4,000 lbs, 6,000 lbs, and 8,000 lbs rotorcraft weight, respectively. The equal rotor efficiency at maximum forward speed was pre-selected for the design of the OSTR in this comparison. Even at 25,000 feet the substantial improvement in rotor efficiency at the lower cruise speeds is typical for the OSTR low and variable RPM operation. While the dramatic 39% advantage in cruise at 4,000 lbs is reduced 7% at 8,000 lbs, this fact is true only for 25,000 feet cruise altitude. FIG. 20 depicts the same comparison at 10,000 feet and 8,000 lbs at which conditions the efficiency advantage increases from 7% at 25,000 feet to 26% at 10,000 feet.

Furthermore, as can be seen from FIGS. 14–20, the exemplary OSTR maximum RPM at cruise at airplane mode (about 183 RPM) is about half of the OSTR maximum RPM (about 360 RPM) at hover in helicopter mode. In order to maintain power throughout such a wide RPM range (i.e., from 360 to 183 RPM) a two-speed transmission, well known in the art, may be used for coupling the rotor to the engine driving the rotor.

FIGS. 14–20 indicate that the current OSTR invention offers the combination of high speed cruise typical of tilt rotor rotorcraft, the cruise efficiency of turboprop aircraft and the efficient low-noise operation of the invention described in U.S. Pat. No. 6,007,298 (Appendix A) when used for low disc loading helicopters operating at low forward speeds.

In an alternate embodiment, instead of operating at a wide range of RPM, the OSTR can be made to operate at 2 or more angular velocities. With such an OSTR, the benefits in efficiency will be substantial but not as great as the benefits achieved by an OSTR operating over a wide range of RPM.

In an alternate embodiment, instead of the 53% increase in rotor diameter (19.16 feet for conventional tilt rotor to 30 feet for OSTR), a lesser increase will provide a lighter and less expensive rotorcraft. With such an OSTR, the benefits in performance, reduced power and noise level in helicopter, conversion and low speed airplane modes will be substantial but not as great as the benefits achieved with the larger diameter OSTR.

Although the present invention has been described and illustrated to respect to an exemplary embodiment, it is to be understood that it is not to be so limited, since changes and modifications may be made therein which are within the full intended scope of this invention as hereinafter claimed.

What is claimed is:

1. A method for improving the efficiency of a rotorcraft for a specific flight condition, the rotorcraft comprising a rotor having radially extending blades and an engine for providing power to rotate the rotor, wherein the rotor operates at an RPM level between and including a maximum rotor RPM level and a minimum rotor RPM level, the method comprising:

ascertaining an RPM level for improving efficiency for the specific flight condition; and adjusting the RPM of the rotor to the ascertained RPM level wherein said ascertained RPM level is less than 94% of maximum RPM.

2. A method as recited in claim 1 wherein the ascertained RPM level is less than 80% of the rotor maximum RPM level.

3. A method as recited in claim 1 wherein the ascertained RPM level is less than 70% of the rotor maximum RPM level.

4. A method as recited in claim 1 wherein the ascertained RPM level is less than 60% of the rotor maximum RPM level.

5. A method as recited in claim 1 wherein the step of ascertaining an RPM level comprises determining a blade loading as a function of RPM level and ascertaining an RPM level for achieving the determined blade loading.

6. A method as recited in claim 5 wherein the step of determining comprises the step of determining a range of blade loadings for improved efficiency for the flight condition, and wherein the step of ascertaining an RPM level for achieving the determined blade loading comprises the step of ascertaining an RPM range for achieving a blade loading within the determined range of blade loadings.

7. A method as recited in claim 1 wherein the rotorcraft is a tilt rotor rotorcraft, and the rotor is a tilt rotor and wherein the specific flight condition is a condition of flight occurring during a mode of flight selected from the group of airplane, helicopter and conversion modes, wherein in helicopter mode the ascertained rotor RPM level is less than 94% of the maximum RPM level.

8. A method as recited in claim 7 wherein during helicopter mode the ascertained rotor RPM level is less than 80% of the maximum RPM level.

9. A method as recited in claim 7 wherein during helicopter mode the ascertained rotor RPM level is less than 70% the maximum RPM level.

10. A method for improving the efficiency of a tilt rotor rotorcraft comprising a tilt rotor, the tilt rotor being capable of tilting to and operating in a helicopter mode, a conversion mode, and an airplane mode, and having radially extending blades and an engine for providing power to rotate the rotor at various RPM levels, the tilt rotor being capable of operation at a maximum RPM level in helicopter mode, the method comprising the steps of:

operating the rotor at an RPM level in helicopter mode; and operating the rotor in airplane mode at an RPM level less than 80% of the maximum RPM level in helicopter mode.

11. A method as recited in claim 10 wherein operating the rotor in airplane mode comprises operating the rotor in airplane mode at an RPM level less than 70% of the maximum RPM level in helicopter mode.

12. A method as recited in claim 10 wherein operating the rotor in airplane mode comprises operating the rotor in airplane mode at an RPM level less than 60% of the maximum RPM level in helicopter mode.

13. A method as recited in claim 10 wherein the operating the rotor at an RPM level in helicopter mode comprises operating the rotor at an RPM level less than 94% of the maximum rotor RPM level in helicopter mode.

14. A method as recited in claim 10 wherein the operating the rotor at an RPM level in helicopter mode comprises operating the rotor at an RPM level less than 80% of the maximum rotor RPM level in helicopter mode.

15. A method as recited in claim 10 wherein the operating the rotor at an RPM level in helicopter mode comprises operating the rotor at an RPM level less than 70% of the maximum rotor RPM level in helicopter mode.

16. A variable speed tilt rotor, wherein the tilt rotor tilts from a helicopter mode position to an airplane mode position, wherein when in helicopter mode the tilt rotor provides lift to a rotorcraft and when in airplane mode the tilt rotor provides thrust to the rotorcraft, the rotor having a radius measured from a center of rotor rotation and a diameter and comprising:
　a rotor hub; and
　at least two blades radially coupled to the hub, each blade having a root proximal the hub and a tip distal to the hub, wherein each blade weight in lbs. does not exceed the product of 0.004 times the diameter of the rotor in feet cubed.

17. A tilt rotor as recited in claim 16 wherein each blade weight in lbs does not exceed the product of 0.0025 times the diameter of the rotor in feet cubed.

18. A tilt rotor as recited in claim 17 wherein the flap stiffness of each blade in lbs-in$^2$ at 30% of the rotor radius as measured from a center of rotor rotation is not less than the product of 100 times the rotor diameter in feet to the fourth power.

19. A tilt rotor as recited in claim 17 wherein the flap stiffness of each blade in lbs-in$^2$ at 30% of the rotor radius as measured from a center of rotor rotation is not less than the product of 200 times the rotor diameter in feet to the fourth power.

20. A tilt rotor as recited in claim 17 wherein the weight of each blade per unit length continuously decreases from the blade root to the blade tip.

21. A tilt rotor as recited in claim 17 wherein the flap, lag and torsional stiffness of each blade continuously decrease from the blade root to the blade tip.

22. A tilt rotor as recited in claim 17 wherein the hub is non-gimbaled and hingeless.

23. A variable speed tilt rotor, wherein the tilt rotor tilts from a helicopter mode position to an airplane mode position, wherein when in helicopter mode the tilt rotor provides lift to a rotorcraft and when in airplane mode the tilt rotor provides thrust to the rotorcraft, the rotor having a radius measured from a center of rotor rotation and a diameter and comprising:
　a rotor hub; and
　at least two blades radially coupled to the hub, each blade having a root proximal the hub and a tip distal to the hub, wherein the flap stiffness of each blade in lbs-in$^2$ at 30% of the rotor radius is not less than the product of 100 times the rotor diameter in feet to the fourth power.

24. A tilt rotor as recited in claim 23 wherein the flap stiffness of each blade in lbs-in$^2$ at 30% of the rotor radius as measured from a center of rotor rotation is not less than the product of 200 times the rotor diameter in feet to the fourth power.

25. A tilt rotor as recited in claim 23 wherein the weight of each blade per unit length continuously decreases from the blade root to the blade tip.

26. A tilt rotor as recited in claim 23 wherein the flap, lag and torsional stiffness of each blade continuously decrease from the blade root to the blade tip.

27. A rotor for a rotorcraft comprising:
　a rotor hub; and
　at least two blades radially coupled to the hub, wherein each blade weight in lbs. does not exceed the product of 0.003 times the diameter of the rotor in feet cubed.

28. A rotor as recited in claim 27 wherein each blade weight in lbs. does not exceed the product of 0.002 times the diameter of the rotor in feet cubed.

29. A rotor as recited in claim 27 wherein each blade weight in lbs. does not exceed the product of 0.001 times the diameter of the rotor in feet cubed.

* * * * *